US012663306B2

(12) United States Patent
Kawamura et al.

(10) Patent No.: US 12,663,306 B2
(45) Date of Patent: Jun. 23, 2026

(54) INFORMATION PROCESSING APPARATUS, INFORMATION PROCESSING METHOD, AND SENSING SYSTEM

(71) Applicant: Sony Semiconductor Solutions Corporation, Kanagawa (JP)

(72) Inventors: Yuusuke Kawamura, Kanagawa (JP); Kazutoshi Kitano, Kanagawa (JP); Kousuke Takahashi, Kanagawa (JP); Takeshi Kubota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 404 days.

(21) Appl. No.: 18/546,009

(22) PCT Filed: Dec. 17, 2021

(86) PCT No.: PCT/JP2021/046878
§ 371 (c)(1),
(2) Date: Aug. 10, 2023

(87) PCT Pub. No.: WO2022/196000
PCT Pub. Date: Sep. 22, 2022

(65) Prior Publication Data
US 2024/0133734 A1 Apr. 25, 2024
US 2024/0230399 A9 Jul. 11, 2024

Related U.S. Application Data

(60) Provisional application No. 63/162,223, filed on Mar. 17, 2021.

(51) Int. Cl.
G01H 9/00 (2006.01)

(52) U.S. Cl.
CPC ................................... G01H 9/00 (2013.01)

(58) Field of Classification Search
CPC ...................................................... G01H 9/00
See application file for complete search history.

(56) References Cited

U.S. PATENT DOCUMENTS

2018/0101744 A1 4/2018 Bar-Nahum
2020/0011996 A1* 1/2020 Sebastian ........... G01B 9/02004
2020/0292303 A1* 9/2020 Sebastian ................ G01S 17/50

FOREIGN PATENT DOCUMENTS

JP H07209035 A * 8/1995
JP H10221159 A 8/1998
(Continued)

OTHER PUBLICATIONS

International Search Report (PCT/ISA/210), International Application No. PCT/JP2021/046878, dated Feb. 22, 2022.

*Primary Examiner* — Catherine T. Rastovski
*Assistant Examiner* — Nyla Gavia
(74) *Attorney, Agent, or Firm* — Michael Best & Friedrich LLP

(57) ABSTRACT

An information processing apparatus according to an embodiment includes a first recognition unit (122) that performs recognition processing based on a point group output by a photodetection distance measurement unit (11), and outputs three-dimensional recognition information of a target object, the photodetection distance measurement unit (11) including a light transmission unit (101) that transmits light modulated by a frequency continuous modulation wave and a light reception unit (103) that receives light and outputs a reception signal, and outputting, based on the reception signal, a point group including a plurality of points each having velocity information, a generation unit (125) that generates vibration distribution information indicating a vibration distribution of the target object based on the velocity information and the three-dimensional recognition information, and a detection unit (20) that detects an abnor- (Continued)

mality of the target object based on the vibration distribution
information.

18 Claims, 16 Drawing Sheets

(56) References Cited

FOREIGN PATENT DOCUMENTS

| | | | | |
|---|---|---|---|---|
| JP | H10239364 | A | * | 9/1998 |
| JP | 2008261688 | A | | 10/2008 |
| JP | 2019537012 | A | | 12/2019 |
| JP | 2020008555 | A | | 1/2020 |

* cited by examiner (a)

Figures 3, 4:
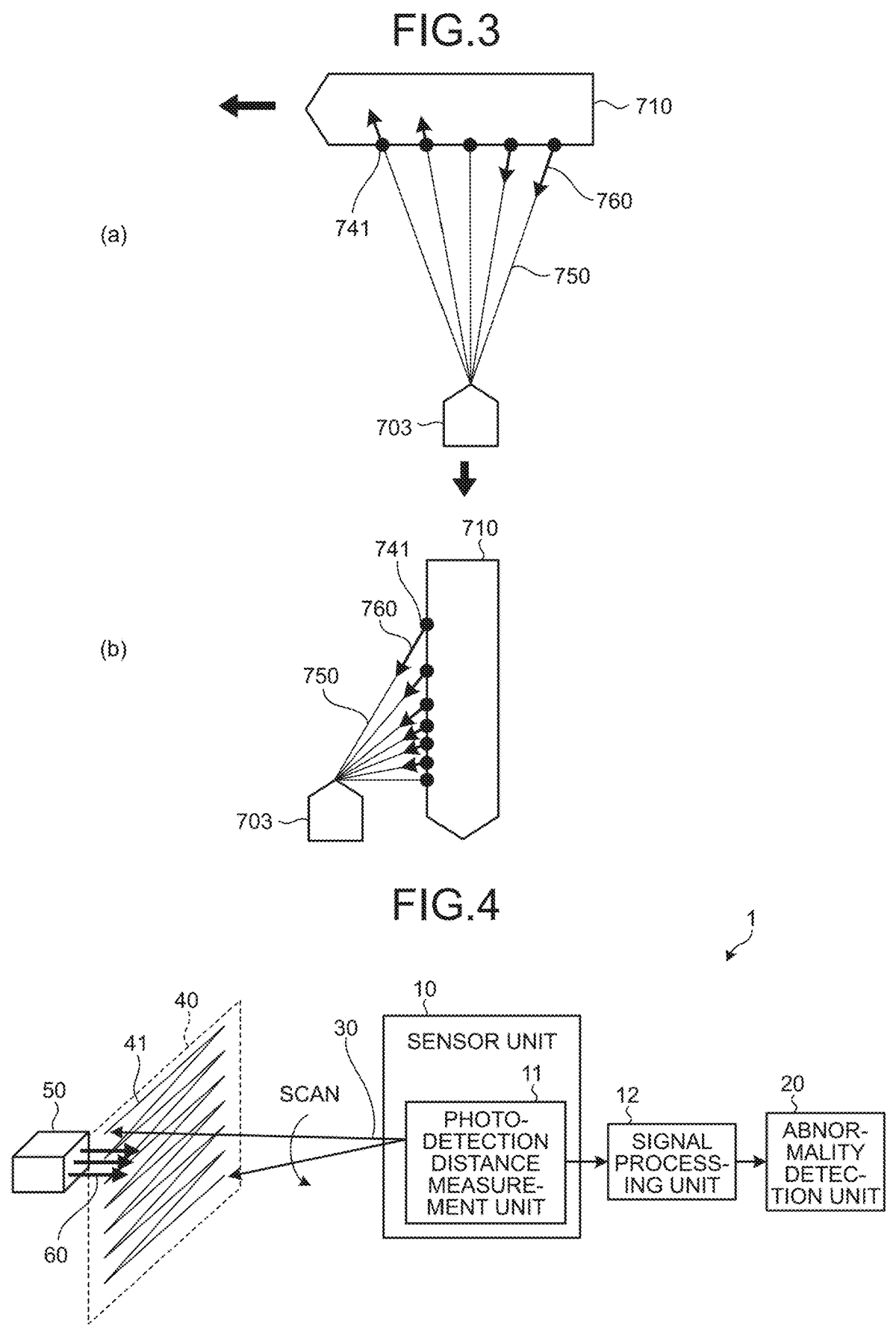

SCAN

10

SENSOR UNIT

11

PHOTO-DETECTION DISTANCE MEASURE-MENT UNIT

12

SIGNAL PROCESS-ING UNIT

20

ABNOR-MALITY DETEC-TION UNIT

INFORMATION PROCESSING APPARATUS, INFORMATION PROCESSING METHOD, AND SENSING SYSTEM

FIELD

The present disclosure relates to an information processing apparatus, an information processing method, and a sensing system.

BACKGROUND

By detecting vibration of an object surface or the like, an abnormality occurring in the object can be detected. There has been known a technique for detecting vibration of the surface of a measurement object or the like in a non-contact manner using optical means. For example, there have been known a method of irradiating a target with laser light and detecting vibration based on reflected light of the laser light and a method of detecting vibration based on a captured image obtained by imaging a measurement object using a high-speed camera.

As a vibrometer using laser light, there has been known a laser Doppler vibrometer that measures vibration using the Doppler effect. For example, the laser Doppler vibrometer performs distance measurement by coherent detection on a reception signal obtained by combining laser light emitted as chirp light in which a frequency of a pulse is linearly changed according to the lapse of time and reflected light of the emitted laser light. Such a distance measurement method using the chirp light and the coherent detection is called as FMCW-LiDAR (Frequency Modulated Continuous Wave-Laser Imaging Detection and Ranging).

In the FMCW-LiDAR, velocity can be measured simultaneously with the distance measurement by using the Doppler effect. Patent Literature 1 discloses a technique for performing distance measurement using frequency-continuously modulated laser light and correcting the Doppler effect at the time of distance measurement.

In addition, as one of methods using a high-speed camera, there has been known a method of detecting, based on a plurality of high-resolution luminance images obtained by imaging a measurement object, a high-speed change point in the high-resolution luminance images and estimating vibration of the measurement object in a visual field plane direction.

CITATION LIST

Patent Literature

Patent Literature 1: JP 2019-537012 A

SUMMARY

Technical Problem

The laser Doppler vibrometer can measure vibration in a depth direction (an irradiation direction of laser light) in non-contact with a target object. However, since the laser Doppler vibrometer measures only one point on the surface of the measurement object, it has been difficult to measure a distribution of vibration on the surface of the measurement object.

In addition, in the method using the high-speed camera, while it has been possible to estimate vibration in the visual field plane direction of the measurement object with the high-speed camera, it has been difficult to detect vibration in the depth direction of the measurement object.

The present disclosure provides an information processing apparatus, an information processing method, and a sensing system capable of detecting an abnormality of a measurement object in a non-contact manner based on vibration distributions in a depth direction and a visual field plane direction.

Solution to Problem

For solving the problem described above, an information processing apparatus according to one aspect of the present disclosure has a first recognition unit that performs recognition processing based on a point group output by a photodetection distance measurement unit, and outputs three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, the point group including a plurality of points each having velocity information; a generation unit that generates vibration distribution information indicating a vibration distribution of the target object based on the velocity information and the three-dimensional recognition information; and a detection unit that detects an abnormality of the target object based on the vibration distribution information.

An information processing method according to one aspect of the present disclosure comprises; a first recognition step of performing recognition processing based on a point group output by a photodetection distance measurement unit, and outputting three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, a point group including a plurality of points each having velocity information; a generation step of generating vibration distribution information indicating a vibration distribution of the target object based on the velocity information and the three-dimensional recognition information; and a detection step of detecting an abnormality of the target object based on the vibration distribution information.

For solving the problem described above, a sensing system according to one aspect of the present disclosure has a photodetection distance measurement unit including a light transmission unit that transmits light modulated by a frequency continuous modulation wave and a light reception unit that receives light and outputs a reception signal, the photodetection distance measurement unit outputting, based on the reception signal, a point group including a plurality of points each having velocity information; a first recognition unit that performs recognition processing based on the point group output by the photodetection distance measurement unit and outputs three-dimensional recognition information of a target object; a generation unit that generates vibration distribution information indicating a vibration distribution of the target object based on the velocity information and the three-dimensional recognition information; and a detection unit that detects an abnormality of the target object based on the vibration distribution information.

BRIEF DESCRIPTION OF DRAWINGS

FIG. 3 is a schematic diagram for explaining velocity detection in a visual field direction by the FMCW-LiDAR applicable to the present disclosure.

FIG. 4 is a schematic diagram for explaining a sensing system according to the present disclosure.

FIG. 5 is a block diagram illustrating a configuration of an example of a photodetection distance measurement unit applicable to embodiments of the present disclosure.

DESCRIPTION OF EMBODIMENTS

Figure 1:
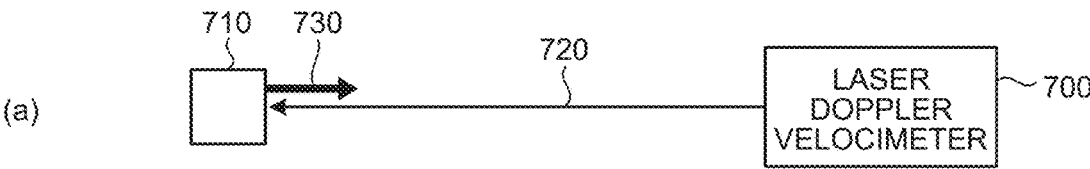
FIG. 1 is a schematic diagram for explaining velocity detection of a target object using optical means according to an existing technique.
Figure 1:
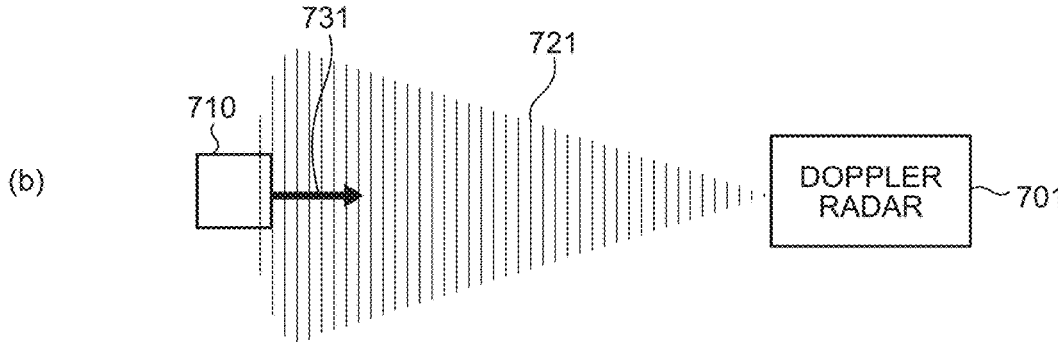
Figure 1:
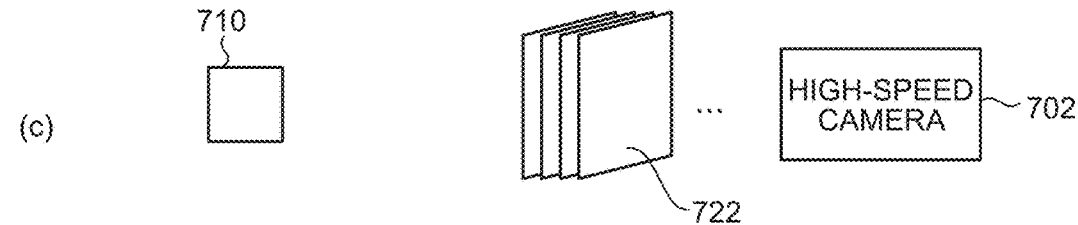

Embodiments of the present disclosure are explained in detail below with reference to the drawings. Note that, in the embodiments explained below, redundant explanation is omitted by denoting the same parts with the same reference numerals and signs.

Embodiments of the present disclosure are explained in detail below according to the following order.

1. Existing technique
2. Overview of the present disclosure
2-1. Technique applicable to the present disclosure 2-2. Overview of a sensing system according to the present disclosure
3. First Embodiment
4. Second Embodiment
5. Third Embodiment 1. Existing Technique The present disclosure relates to a technique suitably used in abnormality detection based on a vibration distribution of an object. Prior to explanation of embodiments of the present disclosure, an existing technique relating to the technique of the present disclosure is schematically explained to facilitate understanding.

There has been known a technique for detecting the velocity of a target object with optical means and detecting vibration of the target object based on the detected velocity. FIG. 1 is a schematic diagram for explaining velocity detection for a target object using optical means according to the existing technique.

Section (a) of FIG. 1 illustrates an example in which the velocity of a target object 710 is detected using a laser Doppler velocimeter 700. For example, the laser Doppler velocimeter 700 irradiates the moving target object 710 with laser light 720 and receives reflected light 730. The laser Doppler velocimeter 700 can measure the velocity of the target object 710 in the optical axis direction of the laser light 720 by calculating a Doppler shift amount of the received reflected light 730. By repeatedly performing this measurement at predetermined time intervals, displacement of the velocity of the target object 710 can be calculated. The vibration of the target object 710 in the optical axis direction of the laser light 720 is detected based on this velocity displacement.

Section (b) of FIG. 1 illustrates an example in which the velocity of the target object 710 is detected using a Doppler radar 701 that uses a millimeter wave 721. Like the laser Doppler velocimeter 700 explained above, the Doppler radar 7001 irradiates the moving target object 710 with the millimeter wave 721 and receives a reflected wave 731. The Doppler radar 701 can measure the velocity of the target object 710 in an irradiation direction of the millimeter wave 721 by calculating a Doppler shift amount of the received reflected wave 731.

Section (c) of FIG. 1 illustrates an example in which the velocity of the target object 710 is detected using a high-speed camera 702. The high-speed camera 702 images the target object 710 with high-speed continuous imaging to obtain a plurality of captured images 722. The velocity of the target object 710 in a visual field direction of the high-speed camera 702 can be detected based on edge information, patterns, and the like in the plurality of captured images 722. Vibration of the target object 710 in a visual field direction can be detected based on displacement of the velocity.

2. Overview of the Present Disclosure

Subsequently, the present disclosure is schematically explained.

2-1. Technique Applicable to the Present Disclosure

Figure 2:
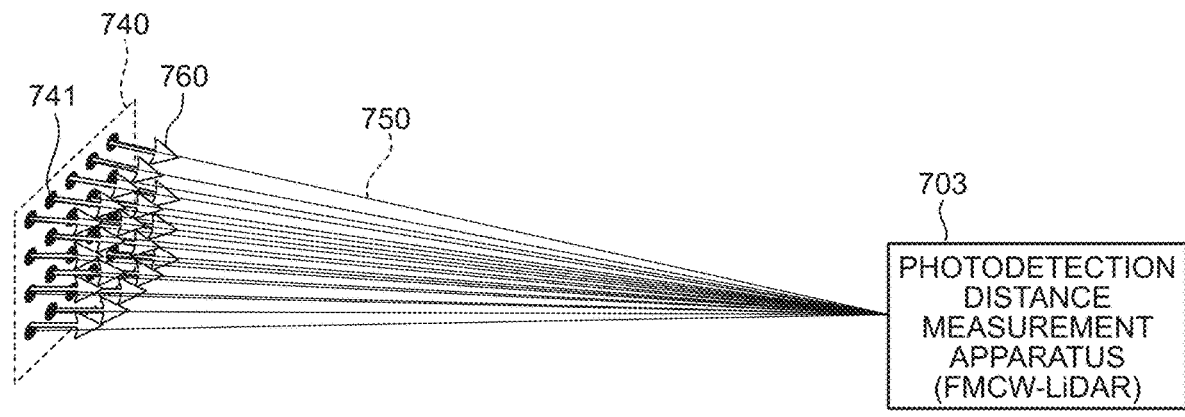
FIG. 2 is a schematic diagram illustrating an example of detecting the velocity of a target object using a photodetection distance measurement apparatus that performs distance measurement by FMCW-LiDAR according to the existing technique.

FIG. 2 is a schematic diagram illustrating an example in which the velocity of the target object 710 is detected using a photodetection distance measurement apparatus 703 that performs distance measurement by FMCW-LiDAR applicable to the present disclosure.

FMCW-LiDAR (Frequency Modulated Continuous Wave-Laser Imaging Detection and Ranging) uses, as laser light to be emitted, chirp light in which a frequency of a pulse is linearly changed, for example, according to the lapse of time. In the FMCW-LiDAR, distance measurement is performed by coherent detection on a reception signal obtained by combining laser light emitted as the chirp light and reflected light of the emitted laser light. In addition, in the FMCW-LiDAR, velocity can be measured simultaneously with the distance measurement by using the Doppler effect.

In FIG. 2, the photodetection distance measurement apparatus 703 acquires measurement values at points 741 while causing a laser light 750 by the chirp light to scan within a predetermined scanning range 740. The measurement value includes three-dimensional position information (3D (Three-Dimensions) coordinates), velocity information, and luminance information. The photodetection distance measurement apparatus 703 outputs measurement value at the points 741 in the scanning range 740 as a point group. That is, the point group is a set of points including the 3D coordinates, the velocity information, and the luminance information.

By intensively scanning a target region including the target object 710 with the photodetection distance measurement apparatus 703, it is possible to acquire a continuous change in velocity and 3D coordinates and measure velocity, acceleration, a frequency per time, displacement, and the like at the points included in the point group. A vibration distribution in the target region can be calculated based on the kinds of information measured from the target region.

In the FMCW-LiDAR, by analyzing the velocity distribution of the point group, not only the velocity of the target object 710 in the depth direction (the optical axis direction of the laser light) but also the velocity in the visual field direction can be detected. Note that the visual field direction refers to a direction of a surface intersecting the optical axis direction of laser light emitted from the photodetection distance measurement apparatus 703 at an emission angle of 0°. The visual field direction may be, for example, a direction of a surface crossing the optical axis direction at a right angle.

FIG. 3 is a schematic diagram for explaining velocity detection in the visual field direction by FMCW-LiDAR applicable to the present disclosure. A section (a) of FIG. 3 illustrates an example in which the target object 710 moves leftward in the visual field direction of the photodetection distance measurement apparatus 703 and a section (b) illustrates an example in which the target object 710 moves downward in a direction perpendicular to the visual field direction of the photodetection distance measurement apparatus 703.

In the example of the section (a) of FIG. 3, since the point 741 on the left side of the target object 710 indicates movement away from the photodetection distance measurement apparatus 703, velocity 760 takes, for example, a positive value. On the other hand, since the point 741 on the right side of the target object 710 indicates movement of approaching the photodetection distance measurement apparatus 703, the velocity 760 takes, for example, a negative value. The absolute value of the velocity 760 increases as the position of the point 741 moves away from a position corresponding to the photodetection distance measurement apparatus 703. In the example of the section (b) of FIG. 3, the velocity 760 changes according to the distances of the points 741 on the target object 710 from the photodetection distance measurement apparatus 703.

The velocity in the visual field direction can be measured by analyzing the velocity distribution of the point group by these points 741. When, for example, an image sensor of related art capable of acquiring color information of colors of red (R), green (G), and blue (B) is used, it is possible to measure the velocity in the visual field direction by extracting feature points such as edge portions and patterns in a captured image and detecting a frame difference of the extracted feature points. In contrast, in the FMCW-LiDAR, it is possible to acquire velocity and a vibration distribution even at a point having no feature point.

2-2. Overview of a Sensing System According to the Present Disclosure

Subsequently, an overview of a sensing system according to the present disclosure is explained.

FIG. 4 is a schematic diagram for explaining the sensing system according to the present disclosure. In FIG. 4, a sensing system 1 includes a sensor unit 10, a signal processing unit 12, and an abnormality detection unit 20.

The sensor unit 10 includes a photodetection distance measurement unit 11 that performs distance measurement for a target object 50, which is a measurement object, with the FMCW-LiDAR. The photodetection distance measurement unit 11 includes a mechanism for scanning laser light with a mechanical scanner, micro electro mechanical systems (MEMS), or an optical phased array (OPA). The photodetection distance measurement unit 11 scans laser light by chirp light in the predetermined scanning range 40 according to a scanning line 41 and acquires a point group including information concerning measurement points in the scanning line 41. The point group includes velocity information indicating the velocity 60 at points in the target object 50, 3D coordinates of the points, and the like. The photodetection distance measurement unit 11 acquires a point group (referred to as frame point group) for one frame in one scan for the scanning range 40.

The signal processing unit 12 applies signal processing to the point group acquired by the photodetection distance measurement unit 11 and acquires vibration distribution information indicating a distribution of vibration in the target object 50. The abnormality detection unit 20 detects the presence or absence of an abnormality in the target object 50 based on the vibration distribution information of the target object 50 acquired by the signal processing unit 12.

In the sensing system 1, the signal processing unit 12 and the abnormality detection unit 20 may be configured by, for example, an information processing program being executed on an information processing apparatus including a CPU (Central Processing Unit). Not only this, but one or both of the signal processing unit 12 and the abnormality detection unit 20 may be configured by a hardware device, or the signal processing unit 12 and the abnormality detection unit 20 may be configured on different information processing apparatuses.

Figure 5:
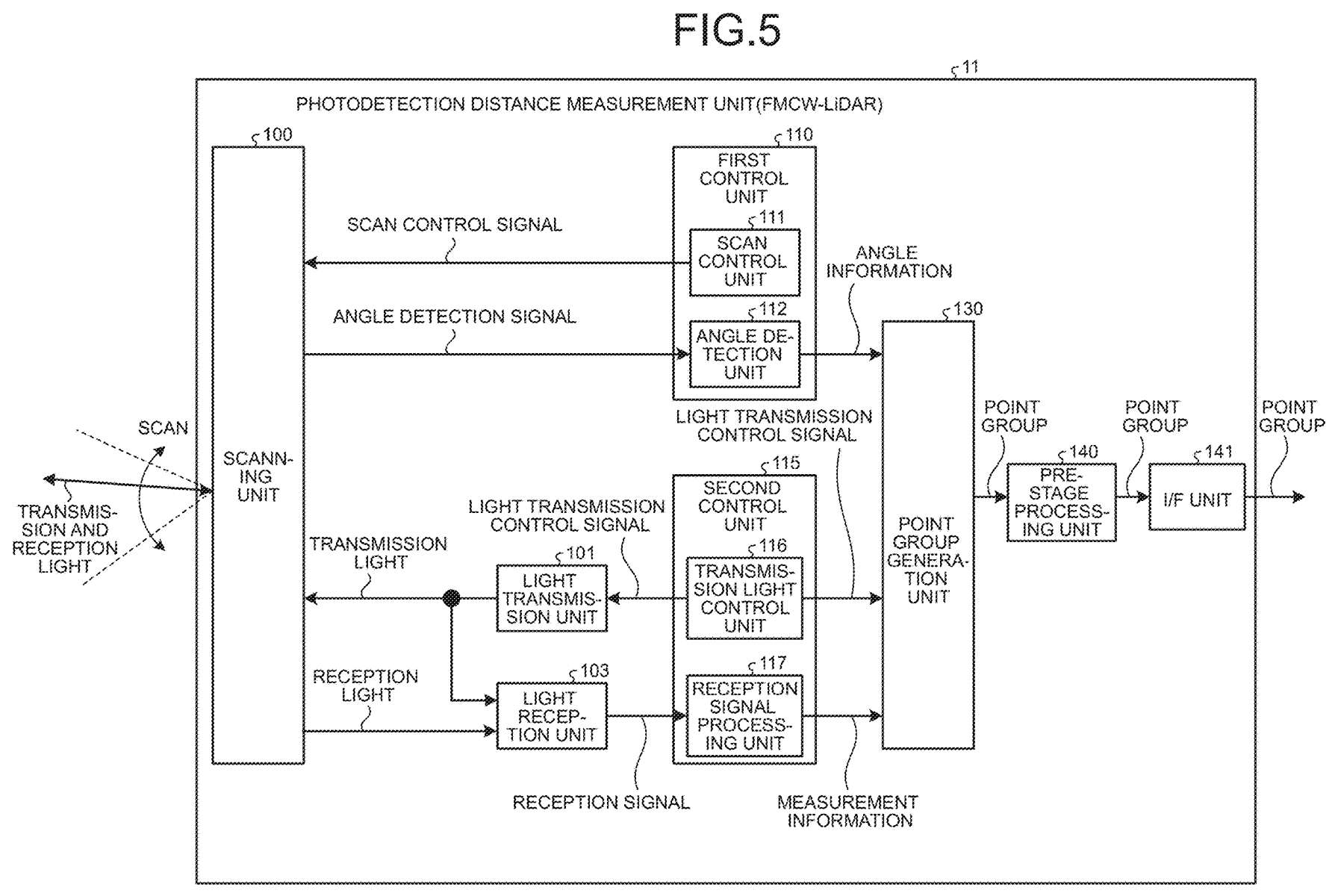

FIG. 5 is a block diagram illustrating a configuration of an example of the photodetection distance measurement unit 11 applicable to embodiments of the present disclosure. In FIG. 5, the photodetection distance measurement unit 11 includes a scanning unit 100, a light transmission unit 101, a light reception unit 103, a first control unit 110, a second control unit 115, a point group generation unit 130, a pre-stage processing unit 140, and an interface (I/F) unit 141.

The first control unit 110 includes a scan control unit 111 and an angle detection unit 112 and controls scanning by the scanning unit 100. The second control unit 115 includes a transmission light control unit 116 and a reception signal processing unit 117 and performs control of transmission of laser light by the photodetection distance measurement unit 11 and processing for reception light.

The light transmission unit 101 includes, for example, a light source such as a laser diode for emitting laser light, which is transmission light, an optical system for emitting light emitted by the light source, and a laser output modulation device that drives the light source. The light transmission unit 101 causes the light source to emit light according to a light transmission control signal supplied from the transmission light control unit 116 explained below and emits transmission light by chirp light, the frequency of which linearly changes within a predetermined frequency range according to the lapse of time. The transmission light is sent to the scanning unit 100 and are sent to the light reception unit 103 as locally emitted light.

The transmission light control unit 116 generates a signal, the frequency of which linearly changes (for example, increases) within a predetermined frequency range according to the lapse of time. Such a signal, the frequency of which linearly changes within the predetermined frequency range according to the lapse of time, is referred to as chirp signal. The transmission light control unit 116 generates, based on the chirp signal, a modulation synchronization timing signal input to the laser output modulation device included in the light transmission unit 101. The transmission light control unit 116 generates a light transmission control signal. The transmission light control unit 116 supplies the generated light transmission control signal to the light transmission unit 101 and the point group generation unit 130.

Reception light received by the scanning unit 100 is input to the light reception unit 103. The light reception unit 103 includes, for example, a light reception part that receives input reception light and a driving circuit that drives the light reception part. As the light reception part, for example, a pixel array in which light receiving elements such as photodiodes respectively configuring pixels are arranged in a two-dimensional lattice pattern can be applied.

The light reception unit 103 further includes a combining unit that combines the input reception light and the locally emitted light sent from the light transmission unit 101. If the reception light is reflected light from a target object of the transmission light, each beam of the reception light is a signal delayed according to the distances to the target object with respect to the locally emitted light. Combined signals obtained by combining the reception light and the locally emitted light are signals (beat signals) having a constant frequency. The light reception unit 103 supplies signals corresponding to the reception light to the reception signal processing unit 117 as reception signals.

The reception signal processing unit 117 performs signal processing such as fast Fourier transform on the reception signals supplied from the light reception unit 103. With this signal processing, the reception signal processing unit 117 calculates the distance to the target object and velocity indicating the velocity of the target object and generates measurement information including distance information and velocity information respectively indicating the distance and the velocity. The reception signal processing unit 117 further calculates luminance information indicating the luminance of the target object based on the reception signals and includes the luminance information in the measurement information. The reception signal processing unit 117 supplies the generated measurement information to the point group generation unit 130.

The scanning unit 100 transmits transmission light sent from the light transmission unit 101 at an angle conforming to the scan control signal supplied from the scan control unit 111 and receives light incident from the angle as reception light. When, for example, a biaxial mirror scanning device is applied as a scanning mechanism for the transmission light in the scanning unit 100, the scan control signal is, for example, a drive voltage signal applied to axes of the biaxial mirror scanning device.

The scan control unit 111 generates a scan control signal for changing the transmission/reception angle by the scanning unit 100 within a predetermined angle range and supplies the scan control signal to the scanning unit 100. The scanning unit 100 can execute scanning in a fixed range by the transmission light according to the supplied scan control signal.

The scanning unit 100 includes a sensor that detects an emission angle of transmission light to be emitted and outputs an angle detection signal indicating the emission angle of the transmission light detected by the sensor. The angle detection unit 112 calculates a transmission/reception angle based on the angle detection signal output from the scanning unit 100 and generates angle information indicating the calculated angle. The angle detection unit 112 supplies the generated angle information to the point group generation unit 130.

Figure 6:
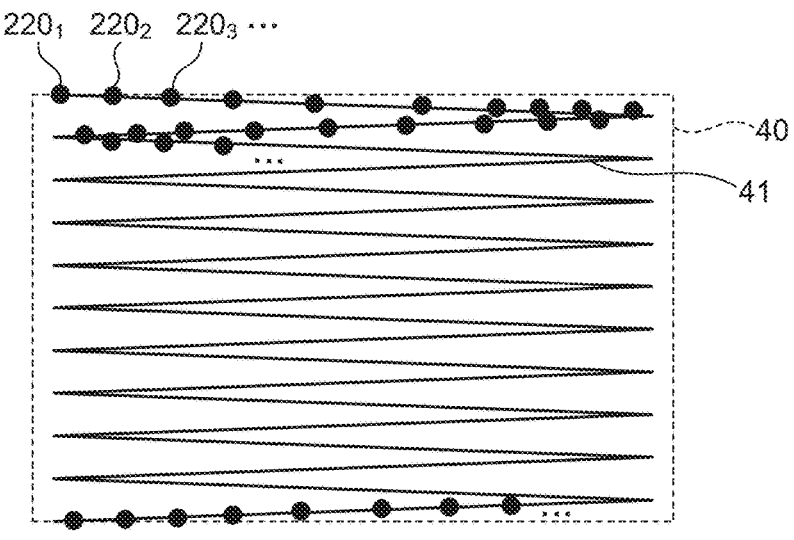
FIG. 6 is a schematic diagram schematically illustrating an example of scanning of transmission light by a scanning unit.

FIG. 6 is a schematic diagram schematically illustrating an example of scanning of transmission light by the scanning unit 100. The scanning unit 100 performs scanning according to a predetermined number of scanning lines 41 within a scanning range 40 corresponding to a predetermined angle range. The scanning line 41 corresponds to one trajectory obtained by performing scanning between the left end and the right end of the scanning range 40. The scanning unit 100 performs scanning between the upper end and the lower end of the scanning range 40 according to the scanning lines 41 according to the scan control signal.

At this time, according to the scan control signal, the scanning unit 100 sequentially discretely changes an emission point of chirp light along the scanning lines 41 at, for example, fixed time intervals (point rates) in such a manner as points $220_1$, $220_2$, $220_3$, . . . . At this time, near turning points at the left end and the right end of the scanning range 40 of the scanning lines 41, scanning velocity by the biaxial mirror scanning device decreases. Therefore, the points $220_1$, $220_2$, $220_3$, . . . are not arranged in a lattice pattern in the scanning range 40. Note that the light transmission unit 101 may emit the chirp light to one emission point one or a plurality of times according to the light transmission control signal supplied from the transmission light control unit 116.

Referring back to FIG. 5, the point group generation unit 130 generates a point group based on the angle information supplied from the angle detection unit 112, the light transmission control signal supplied from the transmission light control unit 116, and the measurement information supplied from the reception signal processing unit 113. More specifically, the point group generation unit 130 specifies one point in a space according to an angle and a distance based on the angle information and distance information included in the measurement information. The point group generation unit 130 acquires a point group as a set of specified points under a predetermined condition. The point group generation unit 130 calculates a point group based on velocity information and luminance information included in the measurement information and taking into account velocity and luminance at the specified points. That is, the point group includes information indicating 3D coordinates, velocity, and luminance for the points included in the point group.

The point group generation unit 130 supplies the calculated point group to the pre-stage processing unit 140. The pre-stage processing unit 140 applies predetermined signal processing such as format conversion to the supplied point group. The point group subjected to the signal processing by the pre-stage processing unit 140 is output to the outside of the photodetection distance measurement unit 11 via the I/F unit 141. The point group output from the I/F unit 141 includes 3D coordinate information, velocity information, and luminance information at the points included in the point group.

Figure 7:
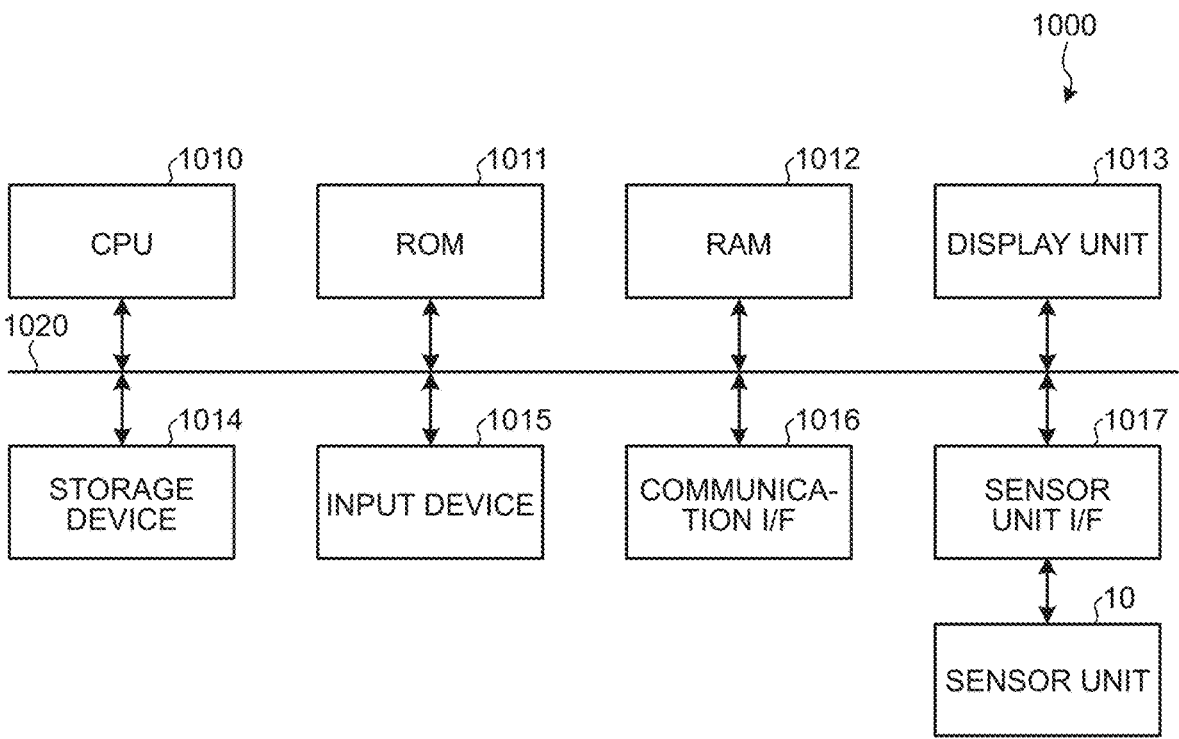
FIG. 7 is a block diagram illustrating a configuration of an example of an information processing apparatus applicable to the embodiments of the present disclosure.

FIG. 7 is a block diagram illustrating a configuration of an example of an information processing apparatus applicable to the embodiments of the present disclosure. In FIG. 7, an information processing apparatus 1000 includes a CPU 1010, a ROM (Read Only Memory) 1011, a RAM (Random Access Memory) 1012, a display unit 1013, a storage device 1014, an input device 1015, a communication interface (I/F) 1016, and a sensor unit I/F 1017 communicably connected to one another via a bus 1020.

As the storage device 1014, a hard disk drive, a nonvolatile memory (a flash memory), or the like can be applied. Various programs and various data are stored in the storage device 1014. The CPU 1010 controls an operation of the entire information processing apparatus 1000 using the RAM 1012 as a work memory according to a program stored in the ROM 1011 or the storage device 1014.

The display unit 1013 includes a display control unit that generates a display signal based on display control information generated by the CPU 1010 and a display device that performs display according to the display signal generated by the display control unit. The display device may be a display device used by being externally connected to the information processing apparatus 1000.

The input device 1015 is a device that receives a user input such as a keyboard. Information corresponding to the user input received by the input device 1015 is transferred to the CPU 1010. The input device 1015 may be a touch panel configured integrally with the display device included in the display unit 1013.

The communication I/F 1016 is an interface for the information processing apparatus 1000 to communicate with external equipment. The communication by the communication I/F 1016 may be communication via a network or communication by direct connection of a hardware device or the like to the information processing apparatus 1000. The communication by the communication I/F 1016 may be wired communication or wireless communication.

The sensor unit I/F 1017 is an interface for connecting the sensor unit 10. In the sensor unit 10, the point group output from the photodetection distance measurement unit 11 is transferred to the CPU 1010 via the sensor unit I/F 1017.

In the information processing apparatus 1000, the CPU 1010 executes an information processing program for realizing the sensing system 1 according to the present disclosure to configure the signal processing unit 12 and the abnormality detection unit 20 explained above respectively as, for example, modules on a main storage region in the RAM 1012.

The information processing program can be acquired from, for example, the outside (for example, not-illustrated another server apparatus) by communication via the communication I/F 1016 and installed on the information processing apparatus 1000. Not only this, but the information processing program may be provided by being stored in a detachable storage medium such as a CD (Compact Disk), a DVD (Digital Versatile Disk), or a USB (Universal Serial Bus) memory.

Note that, although it is explained above that the signal processing unit 12 and the abnormality detection unit 20 are configured on the same information processing apparatus 1000, this is not limited to this example. The signal processing unit 12 and the abnormality detection unit 20 may be respectively configured on different kinds of hardware (such as information processing apparatuses).

3. First Embodiment

Subsequently, a first embodiment of the present disclosure is explained.

Figure 8:
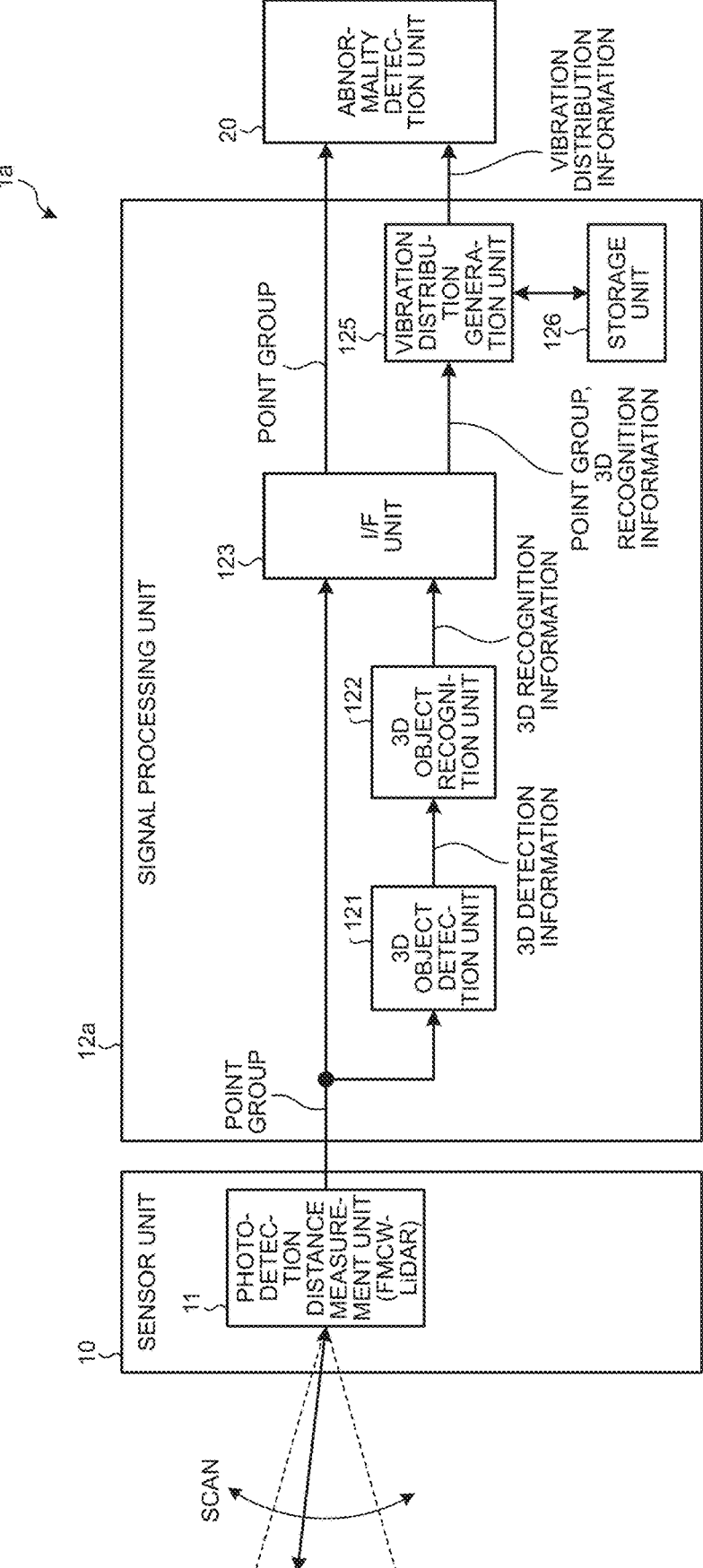
FIG. 8 is a block diagram illustrating a configuration of an example of the sensing system according to the present disclosure in more detail.

FIG. 8 is a block diagram illustrating a configuration of an example of the sensing system according to the present disclosure in more detail. In FIG. 8, a sensing system 1a includes a sensor unit 10, a signal processing unit 12a, and an abnormality detection unit 20. The sensor unit 10 includes the photodetection distance measurement unit 11 and a signal processing unit 12a. The signal processing unit 12a includes a 3D object detection unit 121, a 3D object recognition unit 122, an I/F unit 123, a vibration distribution generation unit 125, and a storage unit 126.

The 3D object detection unit 121, the 3D object recognition unit 122, the I/F unit 123, and the vibration distribution generation unit 125 can be configured by, for example, an information processing program according to the present disclosure being executed on the CPU 1010 in the information processing apparatus 1000. Not only this, but a part or all of the 3D object detection unit 121, the 3D object recognition unit 122, the I/F unit 123, and the vibration distribution generation unit 125 may be configured by hardware circuits that operate in cooperation with one another.

A point group output from the photodetection distance measurement unit 11 is input to the signal processing unit 12a and supplied to the I/F unit 123 and the 3D object detection unit 121 in the signal processing unit 12a.

The 3D object detection unit 121 detects a measurement point indicating a 3D object included in the supplied point group. Note that, in the following explanation, in order to avoid complexity, an expression such as "detect a measurement point indicating a 3D object included in a point group" is described as "detect a 3D object included in a point group" or the like.

The 3D object detection unit 121 detects, from the point group, as a point group (referred to as a localized point group) corresponding to the 3D object, a point group having velocity and a point group including the point group and recognized as having a relationship of, for example, having connection at a fixed or more density. For example, in order to discriminate a static object and a dynamic object included in the point group, the 3D object detection unit 121 extracts points having fixed or larger velocity absolute values from the point group. The 3D object detection unit 121 detects, out of the point group by the extracted points, as a localized point group corresponding to the 3D object, a set of point groups localized in a fixed spatial range (equivalent to the size of a target object). The 3D object detection unit 121 may extract a plurality of localized point groups from the point group.

The 3D object detection unit 121 acquires 3D coordinates, velocity information, and luminance information of the points in the detected localized point group. The 3D object detection unit 121 outputs the 3D coordinates, the velocity information, and the luminance information concerning the localized point group as 3D detection information indicating a 3D detection result. The 3D object detection unit 121 may add label information indicating a 3D object corresponding to the detected localized point group to a region of the localized point group and include the added label information in the 3D detection result.

The 3D object recognition unit 122 acquires the 3D detection information output from the 3D object detection unit 121. The 3D object recognition unit 122 performs, based on the acquired 3D detection information, object recognition for the localized point group indicated by the 3D detection information. For example, when the number of points included in the localized point group indicated by the 3D detection information is equal to or more than a predetermined number that can be used to recognize the target object, the 3D object recognition unit 122 performs point group recognition processing on the localized point group. The 3D object recognition unit 122 estimates attribute information concerning the recognized object by the point group recognition processing.

The 3D object recognition unit 122 executes object recognition processing on the localized point group corresponding to the 3D object among the point groups output from the photodetection distance measurement unit 11. For example, the 3D object recognition unit 122 removes point groups of portions other than the localized point group among the point groups output from the photodetection distance measurement unit 11 and does not execute the object recognition processing on the portion. Therefore, it is possible to reduce a load of the recognition processing by the 3D object recognition unit 122.

When the reliability of the estimated attribute information is equal to or higher than a fixed degree, that is, when the recognition processing has been successfully significantly executed, the 3D object recognition unit 122 outputs a recognition result for the localized point group as the 3D recognition information. The 3D object recognition unit 122 can include, in the 3D recognition information, the 3D coordinate, the 3D size, the velocity information, the attribute information, and the reliability concerning the localized point group. Note that, as a result of the recognition processing, the attribute information is information indicating, for each of the points of the point group, attributes of a target object, to which a unit of the point belongs, such as a type and a specific classification of the target object.

The 3D recognition information output from the 3D object recognition unit 122 is input to the I/F unit 123. As explained above, the point group output from the photodetection distance measurement unit 11 is also input to the I/F unit 123. The I/F unit 123 integrates the point group with the 3D recognition information and supplies the integrated point group to the vibration distribution generation unit 125. The I/F unit 123 supplies, to an abnormality detection unit 20 explained below, the point group supplied from the photodetection distance measurement unit 11.

The vibration distribution generation unit 125 estimates a distribution of vibration in the target object 50 based on the point group and the 3D recognition information supplied from the I/F unit 123 and generates vibration distribution information. The vibration distribution generation unit 125 may estimate a vibration distribution of the target object 50 using the supplied 3D recognition information and 3D recognition information in the past concerning the localized point group stored in the storage unit 126.

The vibration distribution generation unit 125 supplies vibration distribution information indicating the estimated vibration distribution to the abnormality detection unit 20. The vibration distribution generation unit 125 cumulatively stores the point group (the localized point group) and the 3D recognition information in the storage unit 126 as information in the past.

The vibration distribution generation unit 125 can generate, based on the point group and the 3D recognition information supplied from the I/F unit 123, display control information for displaying an image to be presented to the user.

The abnormality detection unit 20 detects an abnormality of the target object 50 based on the point group supplied from the signal processing unit 12a and the vibration distribution information. For example, the abnormality detection unit 20 may generate an evaluation value based on the vibration distribution information and performs threshold determination on the generated evaluation value to determine presence or absence of an abnormality in the target object 50. The abnormality detection unit 20 outputs a detection result of an abnormality for the target object 50 to, for example, the outside.

Figure 9:
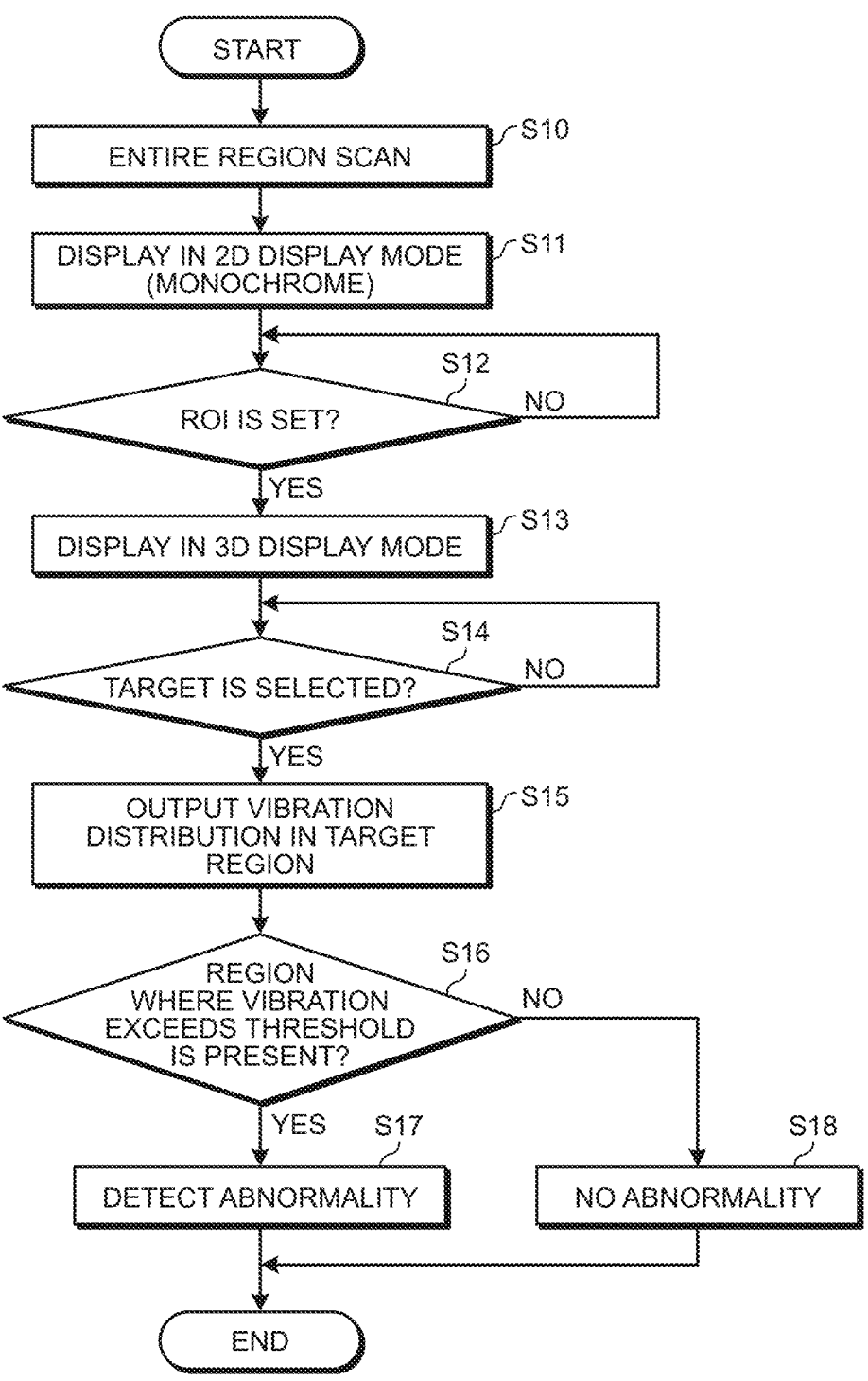
FIG. 9 is a flowchart of an example illustrating abnormality detection processing according to a first embodiment.
Figure 10:
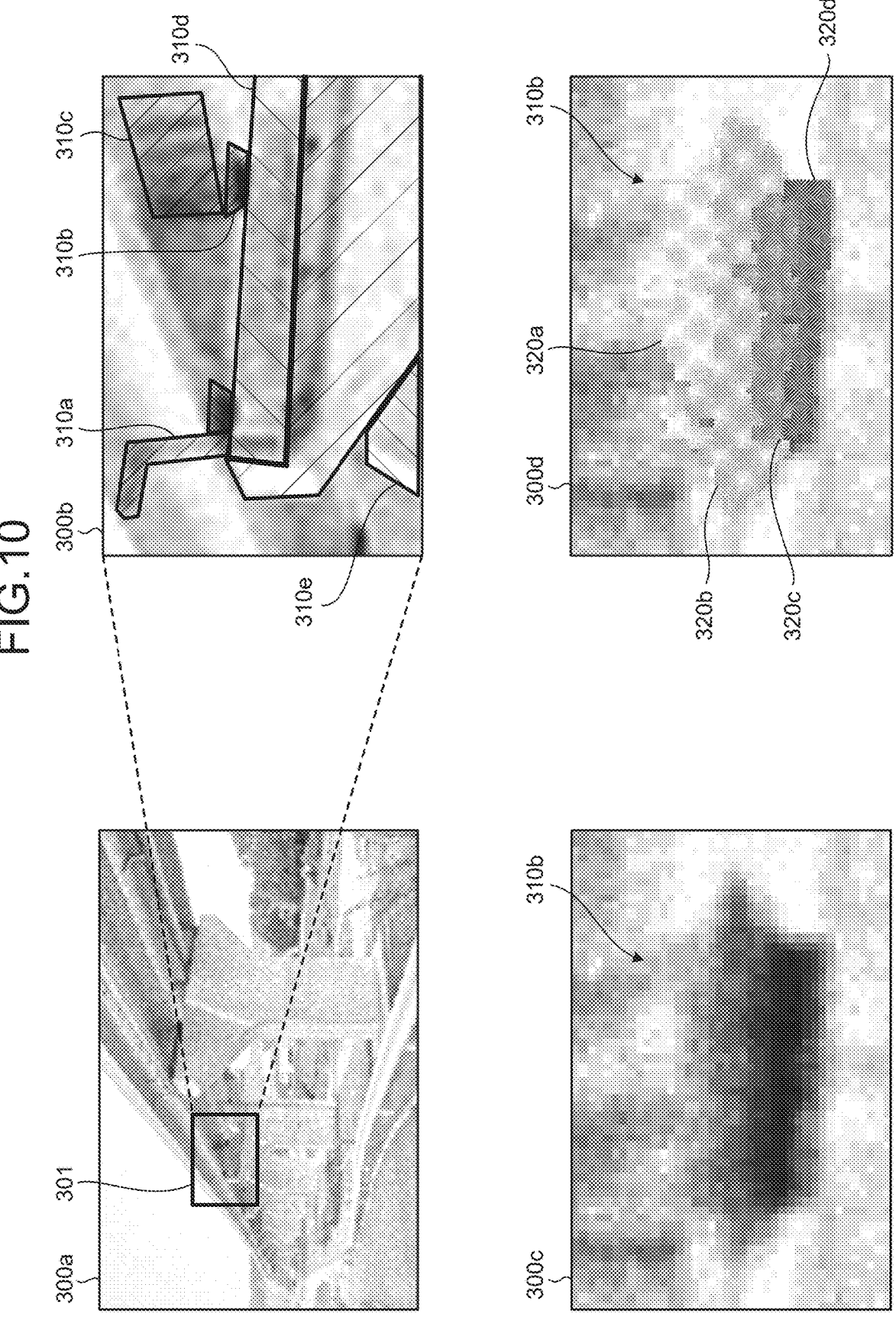
FIG. 10 is a schematic diagram illustrating an example of an image displayed on a display unit in the abnormality detection processing according to the first embodiment.

FIG. 9 is a flowchart of an example illustrating abnormality detection processing according to the first embodiment. FIG. 10 is a schematic diagram illustrating an example of an image displayed on the display unit 1013 in the abnormality detection processing according to the first embodiment.

In FIG. 9, in step S10, the sensing system 1a scans, with the photodetection distance measurement unit 11 of the sensor unit 10, the entire region of the scanning range 40 to acquire a point group in the scanning range 40. In the next step S11, the sensing system 1a generates, with the vibration distribution generation unit 125, a two-dimensional (2D) image of the scanning range 40 based on the point group acquired by the scanning in step S10 and generates display control information for displaying the 2D image in a 2D display mode. Since the point group has only luminance information concerning display, the 2D image displayed by the 2D display mode is a monochrome image. The 2D image is displayed by, for example, the display unit 1013 of the information processing apparatus 1000.

In the next step S12, the sensing system 1a determines whether an ROI (Region of Interest) has been set for the point group in the scanning range 40 acquired in step S10.

For example, the sensing system 1a sets an ROI according to user operation on the 2D image displayed by the display unit 1013 in step 511. When determining, with the vibration distribution generation unit 125, that an ROI has not been set (step 512, "No"), the sensing system 1a returns the processing to step 512. On the other hand, when determining, with the vibration distribution generation unit 125, that an ROI is set (step S12, "Yes"), the sensing system 1a shifts the processing to step S13.

An image 300a illustrated on the upper left of FIG. 10 indicates, with a rectangle, an example of a 2D image in which an ROI 301 is set. The image 300a is a 2D image based on a point group acquired by the scanning range 40 being scanned by the photodetection distance measurement unit 11. Therefore, image 300a has resolution corresponding to points $220_1$, $220_2$, $220_3$, . . . (see FIG. 6) where laser light is emitted by photodetection distance measurement unit 11 in the scanning range 40.

In FIG. 9, in step 513, the sensing system 1a presents the set ROI 301 with the vibration distribution generation unit 125. More specifically, the vibration distribution generation unit 125 causes the display unit 1013 to display the set ROI 301 in a 3D display mode. In the 3D display mode, the vibration distribution generation unit 125 displays, based on 3D recognition information that is an object recognition result by the 3D object recognition unit 122, candidates of a target for which a vibration distribution is detected included in the ROI 301.

An image 300b illustrated on the upper right of FIG. 10 indicates an example in which the ROI 301 in the image 300a in the upper left of the figure is enlarged and displayed and the target candidate is displayed. In the example of the image 300b, regions 310a to 310e extracted as the candidates of a target region based on the 3D recognition information are indicated by hatching. These regions 310a to 310e are recognized as being different parts in the ROI 301 by, for example, the 3D object recognition unit 122.

In FIG. 9, in the next step S14, the sensing system 1a determines, with the vibration distribution generation unit 125, whether a target for vibration distribution detection is selected from the regions 310a to 310e presented as the candidates for the target region in step 513.

For example, the sensing system 1a selects a target region to be a target of vibration distribution detection from the regions 310a to 310e according to user operation on the image 300b displayed by the display unit 1013 in step S13. When determining, with the vibration distribution generation unit 125, that a target region has not been set (step S14, "No"), the sensing system 1a returns the processing to step S14. On the other hand, when determining, with the vibration distribution generation unit 125, that a target region has been selected (step S14, "Yes"), the sensing system 1a shifts the processing to step 515.

An image 300c illustrated on the lower left of FIG. 10 indicates an example of a case in which the region 310b is selected as a target region from the candidates of target regions in step S14. Note that, here, for explanation, one region 310b is selected as the target region for the vibration distribution detection from the plurality of regions 310a to 310e, which are respectively candidates for the target region. However, not only this example, but a plurality of regions can also be selected as the target region.

In step S15, the sensing system 1a detects, with the vibration distribution generation unit 125, a vibration distribution for the target region (the region 310b in this example) selected in step S14 and outputs the vibration distribution in the target region. Vibration distribution generation processing by the vibration distribution generation unit 125 is explained below.

An image 300d illustrated on the lower right of FIG. 10 is an image schematically indicating the vibration distribution in the target region (the region 310b in this example) generated by the vibration distribution generation unit 125. In the image 300d, a region 310b, which is the target region, is divided into regions 320a to 320d according to degrees of vibration and the vibration distribution in the region 310b is illustrated. The image 300d may be displayed on the display unit 1013 and presented to the user or may be information internally included by the vibration distribution generation unit 125.

Vibration parameters indicating degrees of vibration may be, for example, a frequency F (Hz), displacement D (mm), a velocity v (m/s), and acceleration A ($m/s^2$). The vibration distribution may be represented, for example, using any value of the frequency F, the displacement D, the velocity v, and the acceleration A as a representative value or may be represented by a value obtained by combining two or more parameters among these vibration parameters. Not only this, but, for example, a distribution may be calculated for each of these vibration parameters.

In the next step S16, the sensing system 1a determines, with the abnormality detection unit 20, in the target region, based on the vibration distribution output from the vibration distribution generation unit 125, whether a region where a degree of vibration exceeds a threshold is present. For example, the vibration distribution generation unit 125 performs threshold determination on the degree of vibration explained above.

When it is determined by the abnormality detection unit 20 that a region where the degree of vibration exceeds the threshold is present in the target region (step 516, "Yes"), the sensing system 1a shifts the processing to step S17 and determines that an abnormality has been detected in the target region. On the other hand, when it is determined by the abnormality detection unit 20 that a region where the degree of vibration exceeds the threshold is absent in the target region (step S16, "No"), the sensing system 1a shifts the processing to step S18 and determines that there is no abnormality in the target region.

After the processing in step S17 or step S18, a series of processing according to the flowchart of FIG. 9 is ended.

Figure 11:
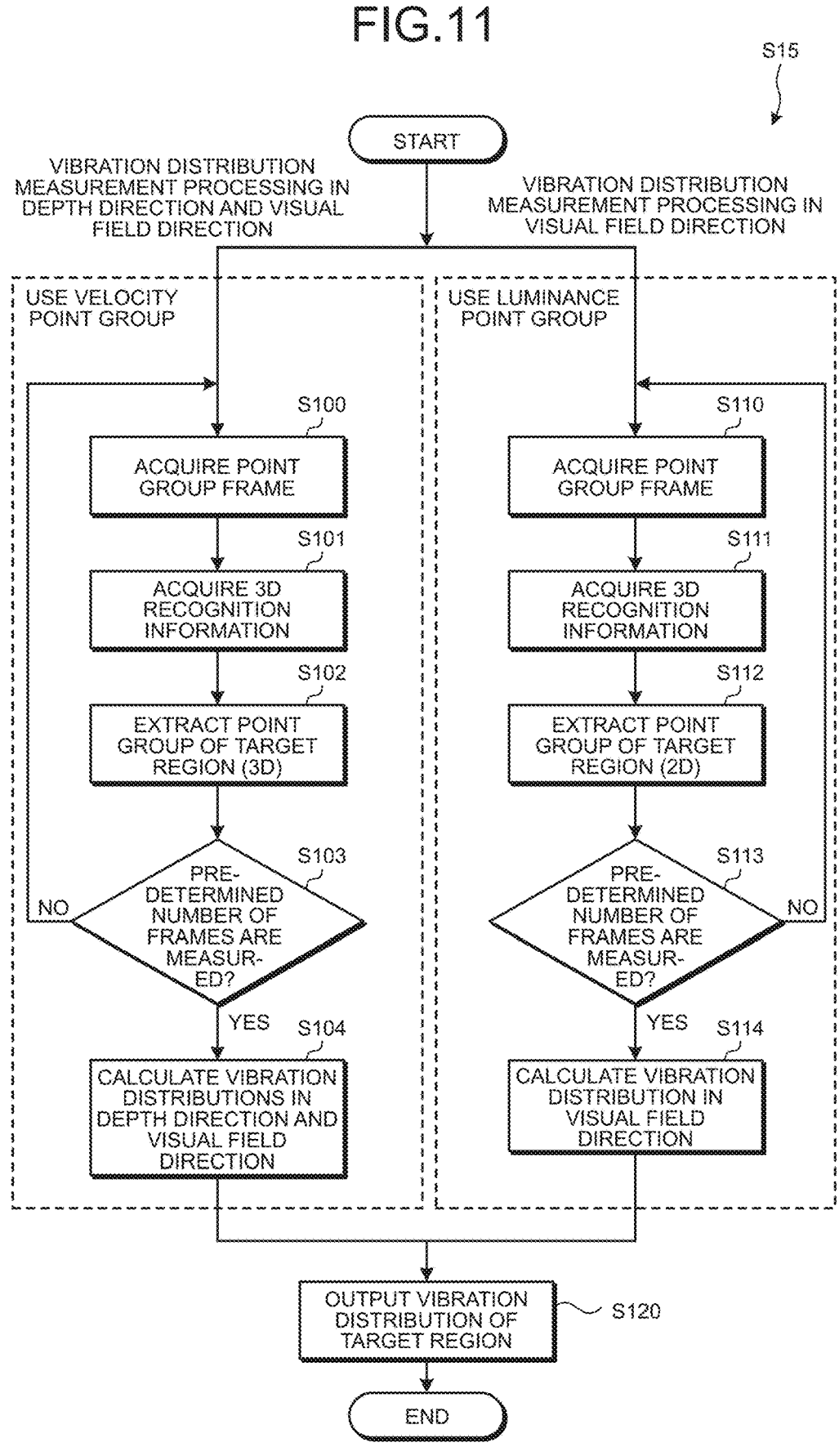
FIG. 11 is a flowchart of an example illustrating vibration distribution generation processing according to the first embodiment.

FIG. 11 is a flowchart of an example illustrating the vibration distribution generation processing according to the first embodiment. The flowchart of FIG. 11 is an example in which the processing in step S15 in FIG. 9 explained above is illustrated more in detail. The flowchart is executed in, for example, the vibration distribution generation unit 125.

In FIG. 11, processing in step S100 to step S104 on the left side is processing for measuring a vibration distribution in a depth direction and a visual field direction using velocity information of a point group. Processing in step S110 to step S114 on the right side is processing for measuring a vibration distribution in the visual field direction using luminance information of the point group. In the following explanation, when the velocity information is used, the point group is referred to as velocity point group as appropriate and, when the luminance information is used, the point group is referred to as luminance point group as appropriate.

First, the vibration distribution measurement processing in the depth direction and the visual field direction using the velocity point group in step S100 to step S104 is explained.

In FIG. 11, in step S100, the vibration distribution generation unit 125 acquires a point group frame by the velocity point group in the entire region of the scanning range 40 based on an output of the photodetection distance measurement unit 11. In the next step S101, the vibration distribution generation unit 125 acquires 3D recognition information obtained by recognition processing by the 3D object recognition unit 122 for the point group frame by the velocity point group. The 3D recognition information includes a 3D position, a 3D size, velocity, an attribute, and reliability of a target recognized from the point group frame by the velocity point group.

In the next step S102, the vibration distribution generation unit 125 extracts a velocity point group of a target region from the point group frame. The velocity point group extracted in step S102 has 3D information. The vibration distribution generation unit 125 may cause the storage unit 126 to store the extracted velocity point group of the target region.

In the next step S103, the vibration distribution generation unit 125 determines whether measurement of a predetermined number of point group frames necessary for vibration detection in the depth direction has been executed. When determining that the measurement of the predetermined number of point group frames has not been executed (step S103, "No"), the vibration distribution generation unit 125 returns the processing to step S100, acquires the next point group frame, and executes measurement for the acquired point group frame (step S101, step S102).

On the other hand, when determining that the measurement of the predetermined number of point group frames has been executed (step S103, "Yes"), the vibration distribution generation unit 125 shifts the processing proceeds to step S104.

In step S104, the vibration distribution generation unit 125 calculates, based on the velocity point group acquired in the processing up to step S103, a vibration distribution in the depth direction (see FIG. 2) and a vibration distribution in the visual field direction (see FIG. 3), for example, with the method explained with reference to FIG. 2 and FIG. 3.

Subsequently, the vibration distribution measurement processing in the visual field direction using the luminance point group in step S110 to step S114 is explained.

In FIG. 11, in step S110, the vibration distribution generation unit 125 acquires, based on the output of the photodetection distance measurement unit 11, a point group frame by the luminance point group in the entire region of the scanning range 40. In the next step S111, the vibration distribution generation unit 125 acquires 3D recognition information obtained by the recognition processing by the 3D object recognition unit 122 for the point group frame by the luminance point group. The 3D recognition information includes a 3D position, a 3D size, velocity, an attribute, and reliability of the target recognized from the point group frame by the luminance point group. In the next step S112, the vibration distribution generation unit 125 extracts a luminance point group of the target region from the point group frame. The vibration distribution generation unit 125 may cause the storage unit 126 to store the extracted luminance point group of the target region.

The vibration distribution generation unit 125 acquires 2D information from the point group frame by the luminance point group. For example, the vibration distribution generation unit 125 projects information concerning points included in the point group frame onto a surface in the visual field direction. Therefore, the luminance point group extracted in step S112 has 2D information.

In the next step S113, the vibration distribution generation unit 125 determines whether measurement of a predetermined number of point group frames necessary for vibration detection in the visual field direction has been executed. When determining that the measurement of the predetermined number of point group frames has not been executed (step S113, "No"), the vibration distribution generation unit 125 returns the processing to step S100, acquires the next point group frame, and executes the measurement on the acquired point group frame (step S111, step S112).

On the other hand, when determining that the measurement of the predetermined number of point group frames has been executed (step S113, "Yes"), the vibration distribution generation unit 125 shifts the processing to step S114.

In step S114, the vibration distribution generation unit 125 calculates a vibration distribution in the visual field direction, for example, with the method explained with reference to section (c) of FIG. 1, based on luminance point groups for a plurality of frames, which are respectively 2D information, acquired in the processing up to step S113.

After the processing in step S104 and step S114 ends, the vibration distribution generation unit 125 shifts the processing to step S120. In step S120, the vibration distribution generation unit 125 integrates the vibration distributions in the depth direction and the visual field direction calculated in step S104 and the vibration distribution in the visual field direction calculated in step S114 to calculate a vibration distribution of the target region and outputs vibration distribution information indicating the calculated vibration distribution to the abnormality detection unit 20.

Note that, in the flowchart of FIG. 11, the processing in step S100 and the processing in step S110 can be executed independently of each other. Not only this, but the processing in step S100 and step S110 may be executed in synchronization. Further, step S100 and step S110 may be processing by the same scanning for the scanning range 40. In this case, the predetermined number determined in steps S103 and S113 is the same number in step S101 and step S113.

As explained above, in the first embodiment, the 3D object recognition processing is performed on the point group output by the photodetection distance measurement unit 11 that performs distance measurement with the FMCW-LiDAR and the point group of the target region is extracted based on a recognition result of the 3D object recognition processing. Therefore, it is possible to measure a vibration distribution in the target region can be measured. It is possible to detect an abnormality of the target object based on the measured vibration distribution.

4. Second Embodiment

Subsequently, a second embodiment of the present disclosure is explained. In the second embodiment, a target region is further set for an ROI and a scanning range by the photodetection distance measurement unit 11 is limited to the target region. By limiting the scanning range in this way, resolution in the scanning range can be made variable and a vibration distribution can be also detected, for example, even for a target object present at a far distance.

Figure 12:
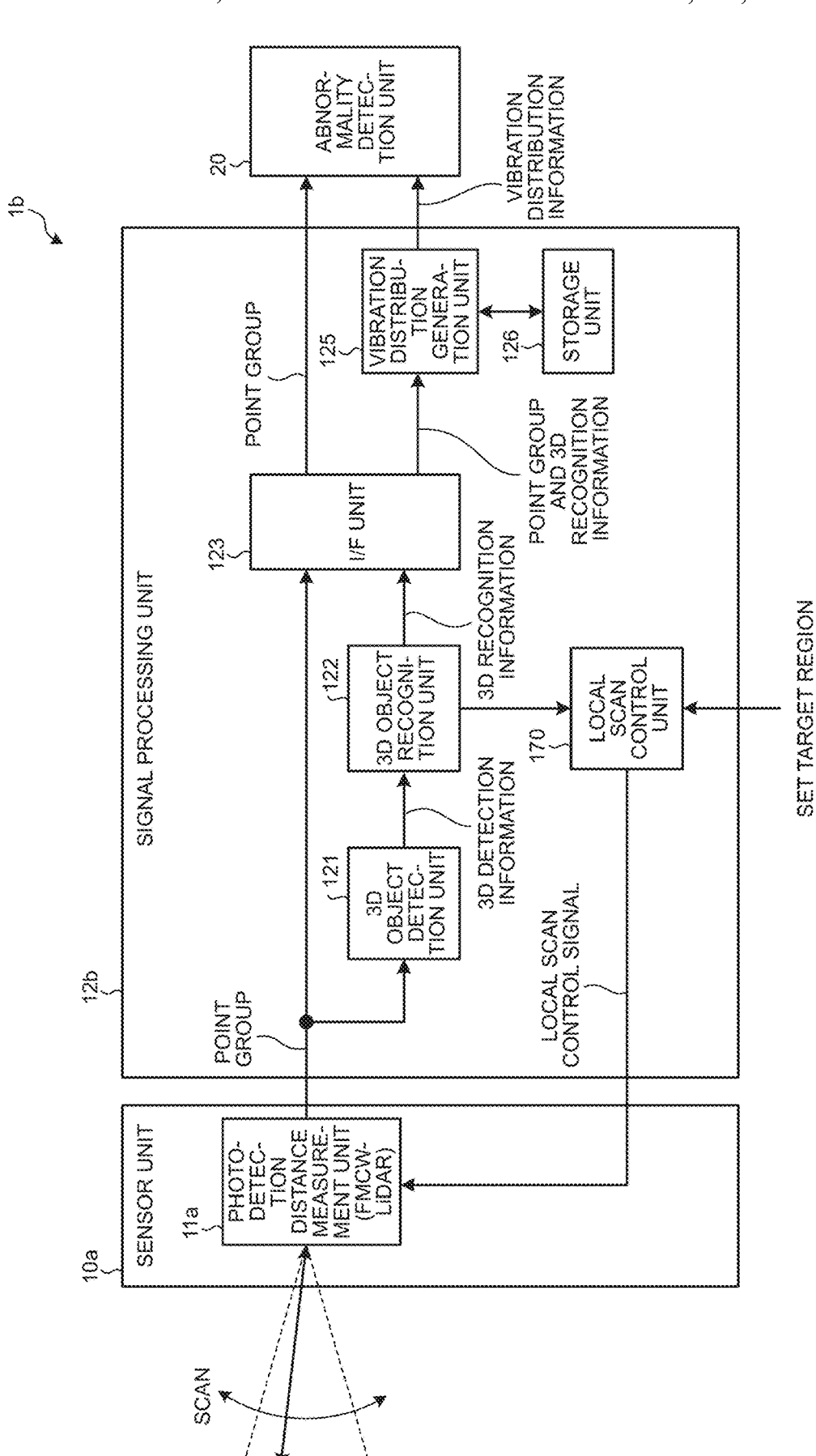
FIG. 12 is a block diagram illustrating a configuration of an example of a sensing system according to a second embodiment.

FIG. 12 is a block diagram illustrating a configuration of an example of a sensing system according to the second embodiment. Note that, in the following explanation, detailed explanation is omitted about parts common to FIG. 8 explained above.

In FIG. 12, a sensing system 1*b* according to the second embodiment includes a sensor unit 10*a*, a signal processing unit 12*b*, and the abnormality detection unit 20. The sensor unit 10*a* includes a photodetection distance measurement unit 11*a*. The photodetection distance measurement unit 11*a* has a configuration equivalent to that of the photodetection distance measurement unit 11 explained with reference to FIG. 5 and is capable of controlling a scanning range in which the scanning unit 100 performs scanning according to a local scan control signal supplied from the outside in addition to a scan control signal generated on the inside. For example, the scanning unit 100 is capable of intensively scanning any region in the scanning range 40 of the entire region of the photodetection distance measurement unit 11*a* as a new scanning range according to the local scan control signal.

The signal processing unit 12*b* has a configuration in which a local scan control unit 170 is added to the signal processing unit 12*a* in the sensing system 1*a* according to the first embodiment illustrated in FIG. 8. Based on the target region setting information and the 3D recognition information output from the 3D object recognition unit 122, the local scan control unit 170 sets a target region, which is a narrower scanning range than the entire scanning range 40 by the photodetection distance measurement unit 11, within the scanning range 40. The local scan control unit 170 outputs a local scan control signal for scanning the set target region.

Figure 13:
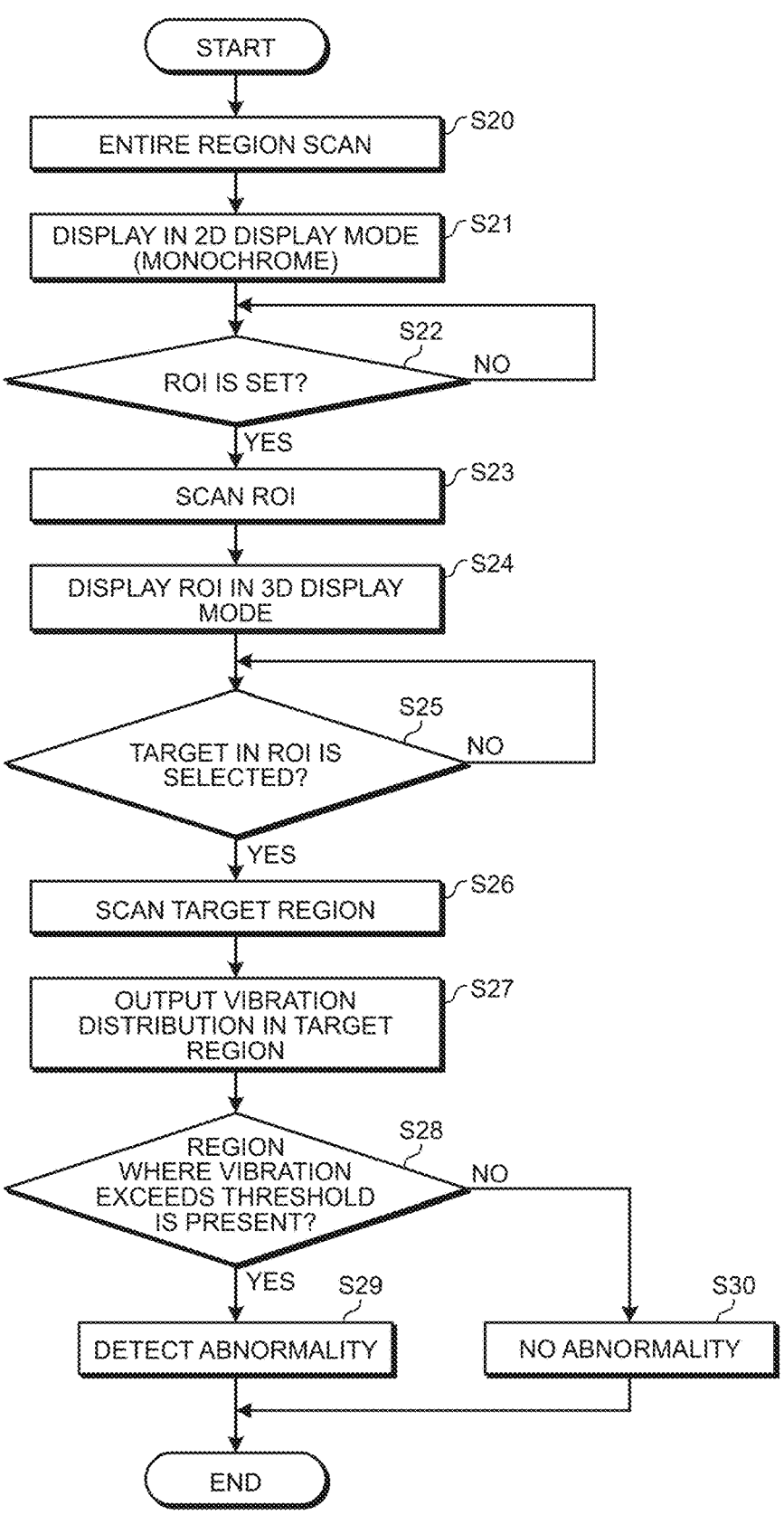
FIG. 13 is a flowchart of an example illustrating abnormality detection processing according to the second embodiment.
Figure 14:
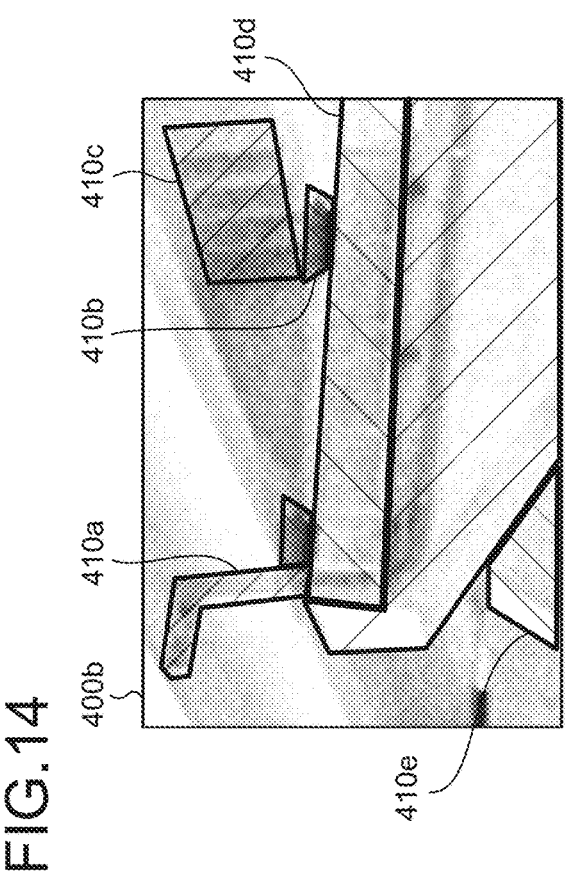
FIG. 14 is a schematic diagram illustrating an example of an image displayed on a display unit in the abnormality detection processing according to the second embodiment.
Figure 14:
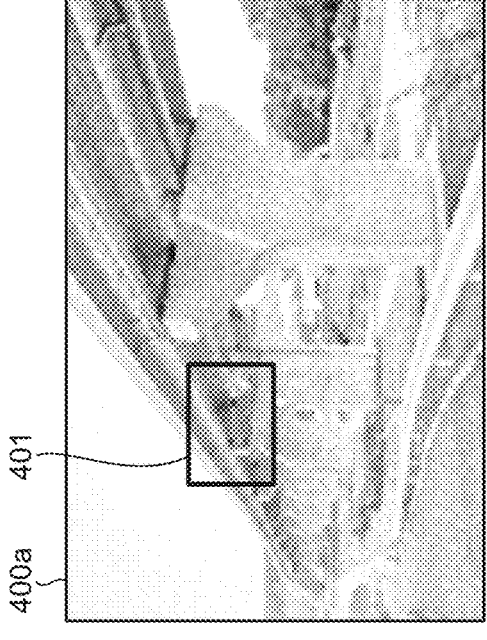
Figure 14:
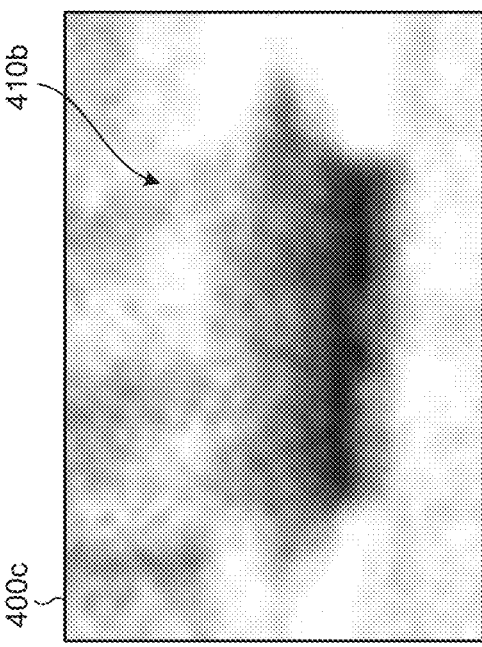

FIG. 13 is a flowchart of an example illustrating abnormality detection processing according to the second embodiment. FIG. 14 is a schematic diagram illustrating an example of an image displayed on the display unit 1013 in the abnormality detection processing according to the second embodiment. Note that, in the explanation with reference to FIG. 13, explanation is omitted as appropriate about parts common to the flowchart of FIG. 9 explained above.

In FIG. 13, in step S20, the sensing system 1b scans, with the photodetection distance measurement unit 11 of the sensor unit 10, the entire region of the scanning range 40 and acquires a point group in the scanning range 40. In the next step S21, the sensing system 1b generates, with the vibration distribution generation unit 125, a 2D image of the scanning range 40 based on the point group acquired by the scanning in step S20 and generates display control information for displaying the 2D image in a 2D display mode. Since the point group has only luminance information concerning display, the 2D image displayed by the 2D display mode is a monochrome image. The 2D image is displayed by, for example, the display unit 1013 of the information processing apparatus 1000.

In the next step S22, the sensing system 1b determines whether an ROI has been set for the point group in the scanning range 40 acquired in step 520. The ROI may be set according to user operation, for example, as explained in step S12 of the flowchart of FIG. 9. When determining, with the vibration distribution generation unit 125, that an ROI has not been set (step S22, "No"), the sensing system 1b returns the processing to step S22. On the other hand, when determining, with the vibration distribution generation unit 125, that an ROI is set (step S22, "Yes"), the sensing system 1b shifts the processing to step 523.

An image 400a illustrated on the upper left of FIG. 14 indicates, with a rectangle, an example of a 2D image in which an ROI 401 is set. The image 400a is a 2D image based on a point group acquired by the scanning range 40 in the entire region being scanned by the photodetection distance measurement unit 11a. Therefore, the image 400a has resolution corresponding to points 220₁, 220₂, 220₃, . . . where laser light by the photodetection distance measurement unit 11a is emitted in the scanning range 40.

In step S23, the sensing system 1b scans the ROI 401 with the photodetection distance measurement unit 11. More specifically, the sensing system 1b generates, with the local scan control unit 170, a local scan control signal for scanning the ROI 401 and outputs the local scan control signal to the photodetection distance measurement unit 11a. The photodetection distance measurement unit 11a scans the ROI 401 according to the local scan control signal supplied from the local scan control unit 170.

In step S23, the photodetection distance measurement unit 11a can scan the ROI 401 at higher density than the scanning of the entire region in step 520. For example, the local scan control unit 170 generates a local scan control signal for controlling the photodetection distance measurement unit 11a to narrow an interval between emission points of chirp light compared with when the entire region is scanned and supplies the local scan control signal to the photodetection distance measurement unit 11a. As explained above, by performing the scanning at the higher density than the scanning for the entire region, a point group having higher resolution than a point group acquired by the scanning for the entire region can be acquired.

In the next step S24, the sensing system 1b causes, with the vibration distribution generation unit 125, based on the point group acquired by the scanning of the ROI in step S23, the display unit 1013 to display an image of the ROI 401 in the 3D display mode. Since the ROI 401 is scanned at the high density in step S23, the image displayed here is set to higher resolution than the 2D image displayed in step S21. In the 3D display mode, the vibration distribution generation unit 125 displays, based on 3D recognition information, which is an object recognition result by the 3D object recognition unit 122, candidates of a target for which a vibration distribution is detected included in the ROI 401.

An image 400b illustrated on the upper right of FIG. 14 indicates an example in which the ROI 401 in the image 400a on the upper left of the figure is enlarged and displayed and the target candidates are displayed. In the example of the image 400b, regions 410a to 410e extracted as target candidates based on the 3D recognition information are respectively indicated by hatching. These regions 410a to 410e are recognized, for example, by the 3D object recognition unit 122, as being different parts in the ROI 401.

In FIG. 13, in the next step S25, the sensing system 1b determines, with the vibration distribution generation unit 125, whether a target of vibration distribution detection has been selected from the regions 410a to 410e presented as the target candidates in step S24.

For example, the sensing system 1b selects a target to be subjected to vibration distribution detection from the regions 410a to 410e according to user operation on the image 400b displayed by the display unit 1013 in step S24. When determining, with the vibration distribution generation unit 125, that no target is set (step S25, "No"), the sensing system 1b returns the processing to step S25. On the other hand, when determining, with the vibration distribution generation unit 125, that a target is selected (step S25, "Yes"), the sensing system 1b shifts the processing to step S26.

An image 400c illustrated on the lower left of FIG. 14 indicates an example of a case in which the region 410b is selected as a target from the target candidates in step S25. Note that it is also possible to select a plurality of regions as targets.

In the next step S26, the sensing system 1b scans, with the photodetection distance measurement unit 11, the target region (the region 410b in this example) selected in step S25. More specifically, the sensing system 1b generates, with the local scan control unit 170, a local scan control signal for scanning the target region and outputs the local scan control signal to the photodetection distance measurement unit 11a. The photodetection distance measurement unit 11a scans the target region according to the local scan control signal supplied from the local scan control unit 170.

In step S26, the photodetection distance measurement unit 11a can scan the target region at higher density than the scanning of the entire region in step S20 and the scanning of the ROI 401 in step S23. For example, the local scan control unit 170 can generate a local scan control signal for controlling the photodetection distance measurement unit 11a to further narrow the interval between emission points of the chirp light compared with when the entire region of the ROI 401 is scanned. As explained above, by performing the scanning for the target region at higher density than the scanning for the entire region and the ROI 401, it is possible to acquire a point group having higher resolution than the point group acquired by the scanning for the entire region or the scanning for the ROI 401.

In the next step S27, the sensing system 1b detects, with the vibration distribution generation unit 125, a vibration distribution in the target region (the region 410*b* in this example) scanned in step S26 and outputs the vibration distribution in the target region. Vibration distribution generation processing by the vibration distribution generation unit 125 is explained below.

An image 400*d* illustrated on the lower right of FIG. 14 is an image schematically indicating the vibration distribution in the target region (the region 410*b* in this example) generated by the vibration distribution generation unit 125. In the image 400*d*, a region 410*b*, which is a target region, is divided into regions 420*a* to 420*d* according to a degree of vibration and a vibration distribution in the region 410*b* is illustrated.

In the next step S28, the sensing system 1*b* determines, with the abnormality detection unit 20, based on the vibration distribution output from the vibration distribution generation unit 125, whether a region where a degree of vibration exceeds a threshold is present in the target region. For example, the vibration distribution generation unit 125 performs threshold determination on the degree of vibration explained above.

When it is determined by the abnormality detection unit 20 that a region where the degree of vibration exceeds the threshold is present in the target region (step S28, "Yes"), the sensing system 1*b* shifts the processing to step S29 and determines that an abnormality is detected in the target region. On the other hand, when it is determined by the abnormality detection unit 20 that a region where the degree of vibration exceeds the threshold is absent in the target region (step S28, "No"), the sensing system 1*b* shifts the processing to step S30 and determines that there is no abnormality in the target region.

After the processing in step S29 or step S30, a series of processing by the flowchart of FIG. 13 is ended.

Figure 15:
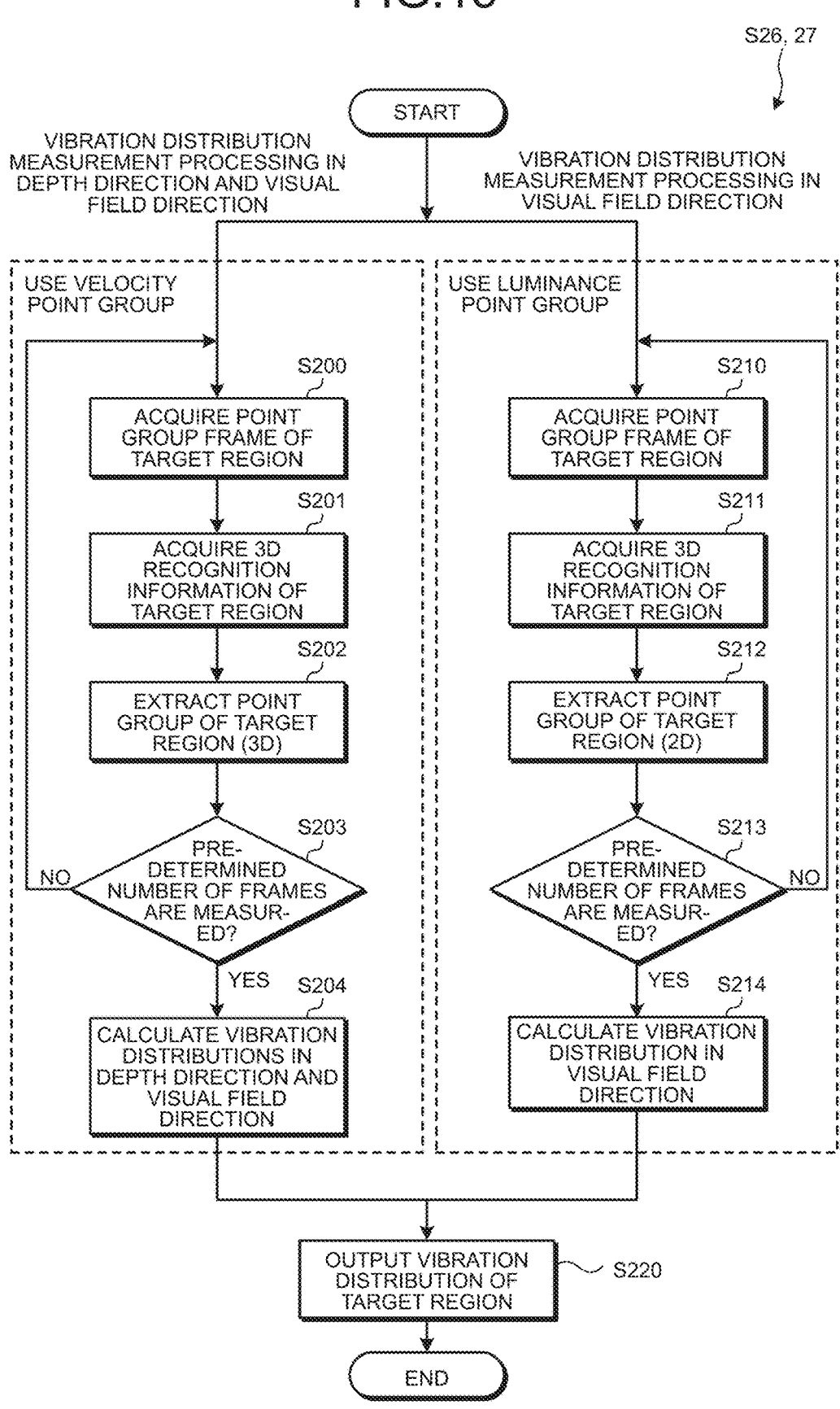
FIG. 15 is a flowchart illustrating an example of vibration distribution generation processing according to the second embodiment.

FIG. 15 is a flowchart of an example illustrating the vibration distribution generation processing according to the second embodiment. The flowchart illustrated in FIG. 15 is an example in which the processing in step S26 and step S27 in FIG. 13 explained above is illustrated more in detail. The flowchart is executed in, for example, the vibration distribution generation unit 125. Note that, in explanation with reference to FIG. 15, explanation is omitted as appropriate about parts common to the flowchart of FIG. 11 explained above.

In FIG. 15, processing in step S200 to step S204 on the left side is processing for measuring a vibration distribution in a depth direction and a visual field direction using a velocity point group. Processing in step S210 to step S214 on the right side is processing for measuring a vibration distribution in the visual field direction using a luminance point group.

First, the vibration distribution measurement processing in the depth direction and the visual field direction using the velocity point group in step S200 to step S204 is explained.

The processing in step S200 in FIG. 15 corresponds to the processing in step S26 in the flowchart of FIG. 13. In step S200, the vibration distribution generation unit 125 acquires a point group frame by a velocity point group in a target region based on an output of the photodetection distance measurement unit 11. In the next step S201, the vibration distribution generation unit 125 acquires 3D recognition information obtained by recognition processing by the 3D object recognition unit 122 for the point group frame by the velocity point group. In the next step S202, the vibration distribution generation unit 125 extracts a velocity point group from the point group frame. The velocity point group extracted in step S02 has 3D information. The vibration distribution generation unit 125 may cause the storage unit 126*a* to store the extracted velocity point group of the target region.

In the next step S203, the vibration distribution generation unit 125 determines whether measurement of a predetermined number of point group frames necessary for vibration detection in the depth direction has been executed. When determining that the measurement of the predetermined number of point group frames has not been executed (step S203, "No"), the vibration distribution generation unit 125 returns the processing to step S200, acquires the next point group frame, and executes measurement for the acquired point group frame (step S201, step S202).

On the other hand, when determining that the measurement of the predetermined number of point group frames has been executed (step S203, "Yes"), the vibration distribution generation unit 125 shifts the processing to step S204.

In step S204, the vibration distribution generation unit 125 calculates, based on the velocity point group acquired in the processing up to step S203, a vibration distribution in the depth direction and a vibration distribution in the visual field direction, for example, with the method explained with reference to FIG. 2 and FIG. 3.

Next, the vibration distribution measurement processing in the visual field direction using the luminance point group in step S210 to step S214 is explained.

The processing in step S210 in FIG. 15 corresponds to the processing in step S26 in the flowchart of FIG. 13. In step S210, the vibration distribution generation unit 125 acquires a point group frame by a luminance point group in the target region based on the output of the photodetection distance measurement unit 11. In the next step S211, the vibration distribution generation unit 125 acquires 3D recognition information obtained by recognition processing by the 3D object recognition unit 122 for the point group frame by the luminance point group.

In the next step S212, the vibration distribution generation unit 125 extracts the luminance point group from the point group frame. The vibration distribution generation unit 125 extracts 2D information from the point group frame by the luminance point group. For example, the vibration distribution generation unit 125 projects information concerning points included in the point group frame onto a surface in the visual field direction. Therefore, the luminance point group extracted in step S212 has 2D information. The vibration distribution generation unit 125 may cause the storage unit 126*a* to store the extracted 2D information of the target region.

In the next step S213, the vibration distribution generation unit 125 determines whether measurement of a predetermined number of point group frames necessary for vibration detection in the visual field direction has been executed. When determining that the measurement of the predetermined number of point group frames has not been executed (step S213, "No"), the vibration distribution generation unit 125 returns the processing to step S200, acquires the next point group frame, and executes measurement for the acquired point group frame (step S211, step S212).

On the other hand, when determining that the measurement of the predetermined number of point group frames has been executed (step S213, "Yes"), the vibration distribution generation unit 125 shifts the processing to step S214.

In step S214, the vibration distribution generation unit 125 calculates, based on luminance point groups for a plurality of frames, which are respectively 2D information, acquired in the processing up to step S213, a vibration distribution in the visual field direction, for example, with the method explained with reference to section (c) of FIG. 1.

After the processing in step S204 and step S214 ends, the vibration distribution generation unit 125 shifts the processing to step S220. In step S220, the vibration distribution generation unit 125 integrates the vibration distributions in the depth direction and the visual field direction calculated in step S204 and the vibration distribution in the visual field direction calculated in step S214, calculates a vibration distribution of the target region, and outputs vibration distribution information indicating the calculated vibration distribution to the abnormality detection unit 20.

Note that, as in the flowchart of FIG. 11, in the flowchart of FIG. 15, the processing in step S200 to step S204 and the processing in step S210 to step S214 can be executed independently of each other. Not only this, but the processing in step S200 to step S204 and the processing in step S210 to step S214 may be executed in synchronization. Further, step S200 to step S204 and step S210 to step S214 may be processing by the same scanning for a common scanning range. In this case, the predetermined number determined in step S203 and step S213 is the same number in step S201 and step S213.

As explained above, in the second embodiment, the 3D object recognition processing is performed on the point group output by the photodetection distance measurement unit 11a that performs distance measurement with the FMCW-LiDAR and the point group of the target region is extracted based on a recognition result of the 3D object recognition processing. At this time, in the second embodiment, a range narrower than the scanning range 40 for the entire region of the photodetection distance measurement unit 11a is set as a target region and operation for the target region is executed at high density for scanning for the scanning range 40. Therefore, it is possible to more highly accurately measure the vibration distribution in the target region. It is possible to more highly accurately execute abnormality detection for the target object based on the measured vibration distribution.

5. Third Embodiment

Subsequently, a third embodiment of the present disclosure is explained. The third embodiment is an example in which, in the sensor unit 10a according to the second embodiment explained above, the imaging device is provided in addition to the photodetection distance measurement unit 11a and the object recognition is performed using the point group acquired by the photodetection distance measurement unit 11a and the captured image captured by the imaging device to obtain the recognition information.

An imaging device capable of acquiring a captured image having information concerning colors of red (R), green (G), and blue (B) generally has much higher resolution than the photodetection distance measurement unit 11a by FMCW-LiDAR. Therefore, by performing the recognition processing using the photodetection distance measurement unit 11a and the imaging device, it is possible to more highly accurately execute the detection and the recognition processing compared with when the detection and the recognition processing are performed using only the point group information by the photodetection distance measurement unit 11a.

Figure 16:
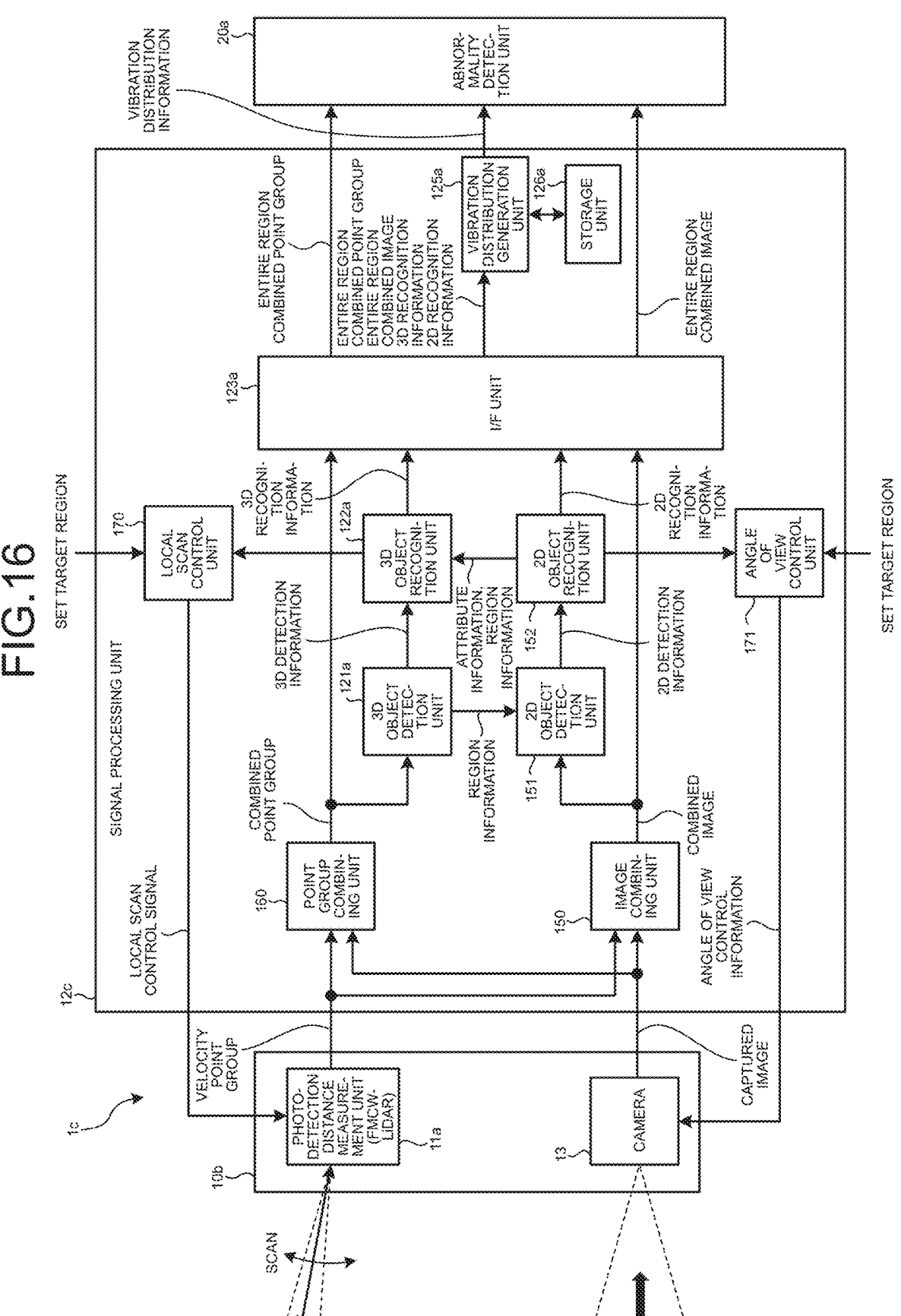
FIG. 16 is a block diagram illustrating a configuration of an example of a sensing system according to a third embodiment.

FIG. 16 is a block diagram illustrating a configuration of an example of a sensing system according to a third embodiment. Note that, in the following explanation, detailed explanation is omitted about parts common to FIG. 12 explained above.

In FIG. 16, a sensing system 1c according to the third embodiment includes a sensor unit 10b, a signal processing unit 12c, and an abnormality detection unit 20a.

The sensor unit 10b includes the photodetection distance measurement unit 11a and a camera 13. The camera 13 is an imaging device including an image sensor capable of acquiring a captured image having information of each color of RGB described above (hereinafter referred to as color information as appropriate), and is capable of controlling an imaging range at an angle of view and a full angle of view according to an angle of view control signal supplied from the outside.

The image sensor includes, for example, a pixel array in which pixels that respectively output signals corresponding to received light are arranged in a two-dimensional lattice shape and a driving circuit for driving the pixels included in the pixel array. The camera 13 includes, for example, a zoom mechanism and an imaging direction control mechanism and is capable of changing an angle of view and an imaging direction according to an angle of view control signal and enlarging and imaging a desired subject within a predetermined limit. The zoom mechanism and the imaging direction control mechanism may be optical or may be electronic.

In FIG. 16, the signal processing unit 12c includes a point group combining unit 160, a 3D object detection unit 121a, a 3D object recognition unit 122a, an image combining unit 150, a 2D (Two Dimensions) object detection unit 151, a 2D object recognition unit 152, and an I/F unit 123a.

The point group combining unit 160, the 3D object detection unit 121a, and the 3D object recognition unit 122a perform processing concerning point group information. The image combining unit 150, the 2D object detection unit 151, and the 2D object recognition unit 152 perform processing concerning a captured image.

The point group combining unit 160 acquires a point group from the photodetection distance measurement unit 11a and acquires a captured image from the camera 13. The point group combining unit 160 combines color information and other information based on the point group and the captured image and generates a combined point group that is a point group obtained by adding new information and the like to measurement points of the point group.

More specifically, the point group combining unit 160 refers to, with coordinate system conversion, pixels of the captured image corresponding to angular coordinates of the measurement points in the point group and, for the measurement points, acquires color information representing the points. The measurement points correspond to the points where the reflected light is received for the points $220_1$, $220_2$, $220_3$, ... explained with reference to FIG. 6. The point group combining unit 160 adds the acquired color information of the measurement points to the measurement information of the measurement points. The point group combining unit 160 outputs the combined point group in which the measurement points have 3D coordinate information, velocity information, luminance information, and color information.

Note that the coordinate system conversion between the point group and the captured image is preferably executed, for example, after calibration processing based on a positional relation between the photodetection distance measurement unit 11a and the camera 13 is performed in advance and a calibration result of the calibration processing is reflected on angular coordinates of a velocity point group and coordinates of pixels in the captured image.

The 3D object detection unit 121a acquires the combined point group output from the point group combining unit 160 and detects measurement points indicating a 3D object included in the acquired combined point group. The 3D object detection unit 121a extracts, as a localized point group, a point group by the measurement points indicating the 3D object detected from the combined point group. Extraction processing for a localized point group and generation processing for region information by the 3D object detection unit 121a are equivalent to the kinds of processing in the 3D object detection unit 121 explained with reference to FIG. 8. Therefore, detailed explanation of the processing is omitted here.

The 3D object detection unit 121a outputs the localized point group, 3D coordinates concerning the localized point group, velocity information, and luminance information as 3D detection information indicating a 3D detection result. The 3D detection information is supplied to the 3D object recognition unit 122a and the 2D object detection unit 151 explained below. At this time, the 3D object detection unit 121a may add label information indicating a 3D object corresponding to the detected localized point group to a region of the localized point group and include the added label information in the 3D detection result.

The 3D object recognition unit 122a acquires the 3D detection information output from the 3D object detection unit 121a. The 3D object recognition unit 122a acquires region information and attribute information output from the 2D object recognition unit 152 explained below. The 3D object recognition unit 122a performs object recognition for the localized point group based on the acquired 3D detection information and the region information acquired from the 2D object recognition unit 152.

Based on the 3D detection information and the region information, when the number of points included in the localized point group is equal to or more than a predetermined number that can be used to recognize the target object, the 3D object recognition unit 122a performs the point group recognition processing on the localized velocity point group. The 3D object recognition unit 122a estimates attribute information concerning an object recognized by the point group recognition processing. In the following explanation, the attribute information based on the point group is referred to as 3D attribute information.

The 3D object recognition unit 122a may execute object recognition processing on a localized point group corresponding to the 3D object among point groups output from the photodetection distance measurement unit 11a. For example, the 3D object recognition unit 122a can remove a point group of a portion other than the localized point group among the point groups output from the photodetection distance measurement unit 11a and can prevent the object recognition processing from being executed on the portion. Consequently, it is possible to reduce a load of the recognition processing by the 3D object recognition unit 122a.

When reliability of the estimated 3D attribute information is equal to or higher than a fixed level, that is, when the recognition processing has been successfully significantly executed, the 3D object recognition unit 122a integrates time information indicating time when the measurement was performed, the 3D region information, and the 3D attribute information and outputs the integrated information as 3D recognition information.

Note that, as a result of the recognition processing, the attribute information is information indicating, for each of points of a point group or each of pixels of an image, attributes of a target object, to which a unit of the point or the pixel belongs, such as a type and a specific classification of the target object. When the target object is a person, for example, the 3D attribute information can be represented as specific numerical values imparted to the points of the point group and belonging to the person.

The image combining unit 150 acquires the velocity point group from the photodetection distance measurement unit 11a and acquires the captured image from the camera 13. The image combining unit 150 generates a distance image and a velocity image based on the velocity point group and the captured image. The distance image is an image including information indicating the distance from the measurement point. The velocity image is an image by the Doppler effect and includes, for example, information indicating velocity and a direction of the velocity with respect to the measurement point.

The image combining unit 150 combines the distance image, the velocity image, and the captured image while matching coordinates with coordinate conversion to generate a combined image by RGB images. The combined image generated here is an image in which pixels have color, distance, and velocity information. Note that the resolution of the distance image and the velocity image is lower than the resolution of the captured image output from the camera 13. Therefore, the image combining unit 150 may match the resolution with the resolution of the captured image by applying processing such as upscaling to the range image and the velocity image.

The image combining unit 150 outputs the generated combined image. Note that the combined image indicates an image in which new information is added to pixels of the image by combining distance, velocity, and other information. The combined image includes 2D coordinate information, color information, distance information, velocity information, and luminance information for each of the pixels. The combined image is supplied to the 2D object detection unit 151 and the I/F unit 123a.

The 2D object detection unit 151 extracts, based on 3D region information output from the 3D object detection unit 121a, a partial image corresponding to the 3D region information from the combined image supplied from the image combining unit 150. The 2D object detection unit 151 detects an object from the extracted partial image and generates region information indicating, for example, a rectangular region having a minimum area including the detected object. The region information based on the captured image is referred to as 2D region information. The 2D region information is represented as a set of points or pixels in which a value given for each of measurement points or pixels by the photodetection distance measurement unit 11a falls within a designated range.

The 2D object detection unit 151 outputs the generated partial image and the 2D region information as the 2D detection information.

The 2D object recognition unit 152 acquires the partial image included in the 2D detection information output from the 2D object detection unit 151, performs image recognition processing such as inference processing on the acquired partial image, and estimates attribute information relating to the partial image. In this case, for example, when the target is a vehicle, the attribute information is represented as a specific numerical value indicating that the target belongs to the vehicle imparted the pixels of the image. In the following explanation, the attribute information based on the partial image (the captured image) is referred to as 2D attribute information.

When reliability of the estimated 2D attribute information is equal to or higher than a fixed level, that is, when the recognition processing has been successfully significantly executed, the 2D object recognition unit 152 integrates the 2D coordinate information, the velocity information, the attribute information, the reliability, and the 2D size information of each of pixels and outputs the integrated information as 2D recognition information. Note that, when the reliability of the estimated 2D attribute information is lower than the fixed level, the 2D object recognition unit 152 may integrate and output the kinds of information excluding the attribute information.

The I/F unit 123*a* receives the combined point group output from the point group combining unit 160 and the 3D recognition information output from the 3D object recognition unit 122*a*. The combined image output from the image combining unit 150 and the 2D recognition information output from the 2D object recognition unit 152 are input to the I/F unit 123*a*. The I/F unit 123*a* selects information to be output from the input combined point group, the 3D recognition information, the combined image, and the 2D recognition information according to, for example, setting from the outside.

Like the local scan control unit 170 in FIG. 12, based on the target region setting information and the 3D recognition information output from the 3D object recognition unit 122*a*, the local scan control unit 170 sets, within the scanning range 40, a target region that is a narrower scanning range than the entire scanning range 40 by the photodetection distance measurement unit 11*a*. The local scan control unit 170 outputs a local scan control signal for scanning the set target region.

Based on the target region setting information and the 2D recognition information output from the 2D object recognition unit, the angle of view control unit 171 sets a target region having a narrower angle of view than the entire angle of view (the entire imaging range) by the camera 13 with respect to the entire angle of view. Here, a common target region setting information is input to the angle of view control unit 171 and the local scan control unit 170. Therefore, the target region set by the angle of view control unit 171 is set to a position and a size corresponding to the target region set by the local scan control unit 170.

The I/F unit 123*a* receives the combined point group output from the point group combining unit 160 and the 3D recognition information output from the 3D object recognition unit 122*a*. The combined image output from the image combining unit 150 and the 2D recognition information output from the 2D object recognition unit 152 are input to the I/F unit 123*a*.

The I/F unit 123*a* outputs the combined point group of the entire region supplied from the point group combining unit 160 and the combined image of the entire region supplied from the image combining unit 150 to the abnormality detection unit 20*a*. The I/F unit 123*a* outputs the combined point group of the entire region, the combined image of the entire region, the 3D recognition information supplied from the 3D object recognition unit 122*a*, and the 2D recognition information supplied from the 2D object recognition unit 152 to a vibration distribution generation unit 125*a*.

The vibration distribution generation unit 125*a* estimates a distribution of vibration in the target object 50 based on the combined point group of the entire region supplied from the I/F unit 123*a*, the combined image of the entire region, the 3D recognition information, and the 2D recognition information and generates vibration distribution information. The vibration distribution generation unit 125*a* may estimate the vibration distribution of the target object 50 using the kinds of supplied information (the combined point group of the entire region, the combined image of the entire region, the 3D recognition information, and the 2D recognition information) and the kinds of information in the past stored in a storage unit 126*a*.

The vibration distribution generation unit 125*a* supplies vibration distribution information indicating the estimated vibration distribution to the abnormality detection unit 20*a*. The vibration distribution generation unit 125*a* cumulatively stores the combined point group of the entire region, the combined image of the entire region, the 3D recognition information, and the 2D recognition information in the storage unit 126*a* as information in the past.

The vibration distribution generation unit 125*a* can generate, based on the combined point group of the entire region, the combined image of the entire region, the 3D recognition information, and the 2D recognition information supplied from the I/F unit 123*a*, display control information for displaying an image to be presented to the user.

The abnormality detection unit 20*a* detects an abnormality of the target object 50 based on the combined point group and the combined image of the entire region supplied from the signal processing unit 12*c* and the vibration distribution information. For example, the abnormality detection unit 20*a* may generate an evaluation value based on the vibration distribution information and perform threshold determination on the generated evaluation value to determine presence or absence of an abnormality in the target object 50. The abnormality detection unit 20*a* outputs a detection result of the abnormality for the target object 50 to, for example, the outside.

Figure 17:
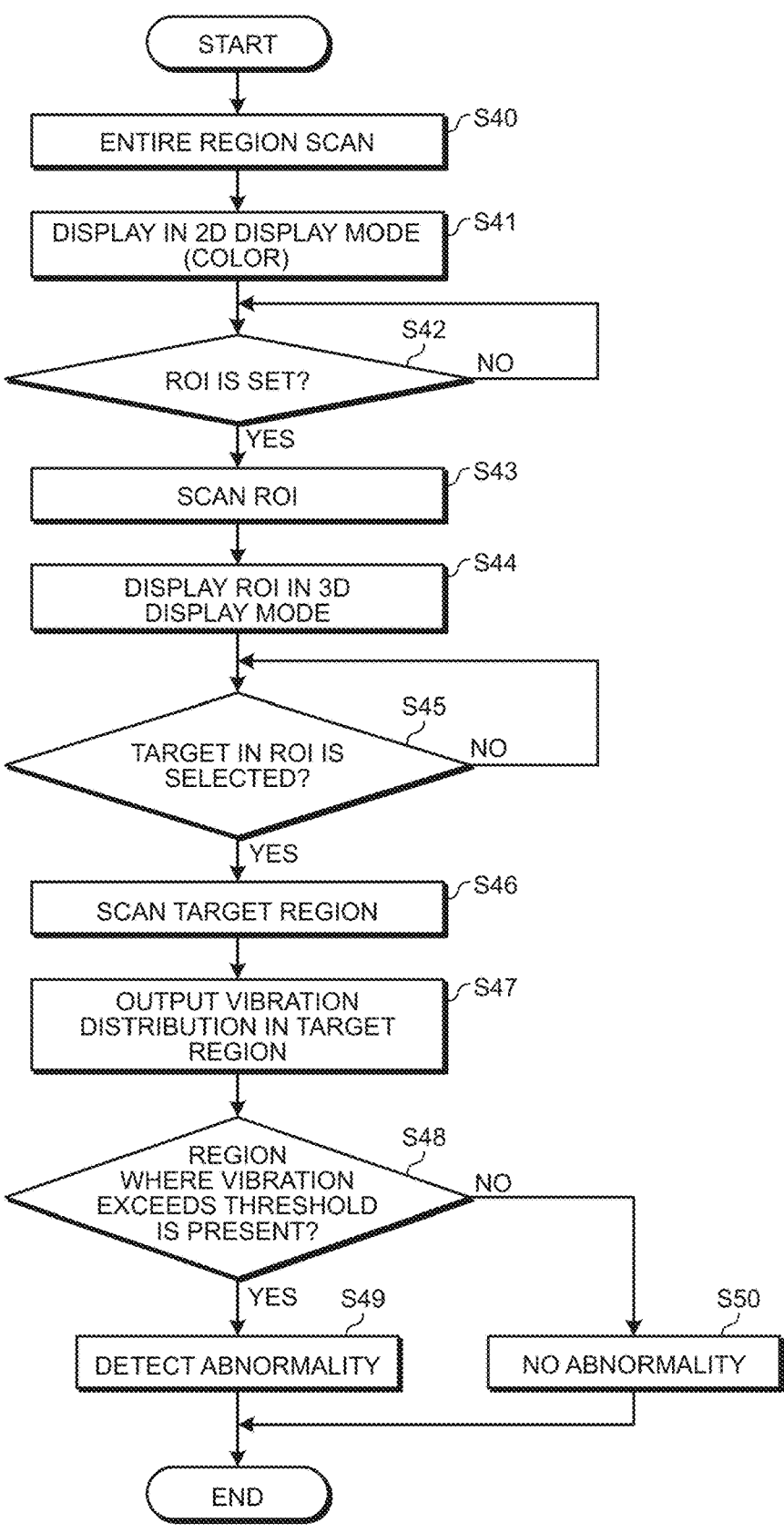
FIG. 17 is a flowchart of an example illustrating abnormality detection processing according to the third embodiment.
Figure 18:
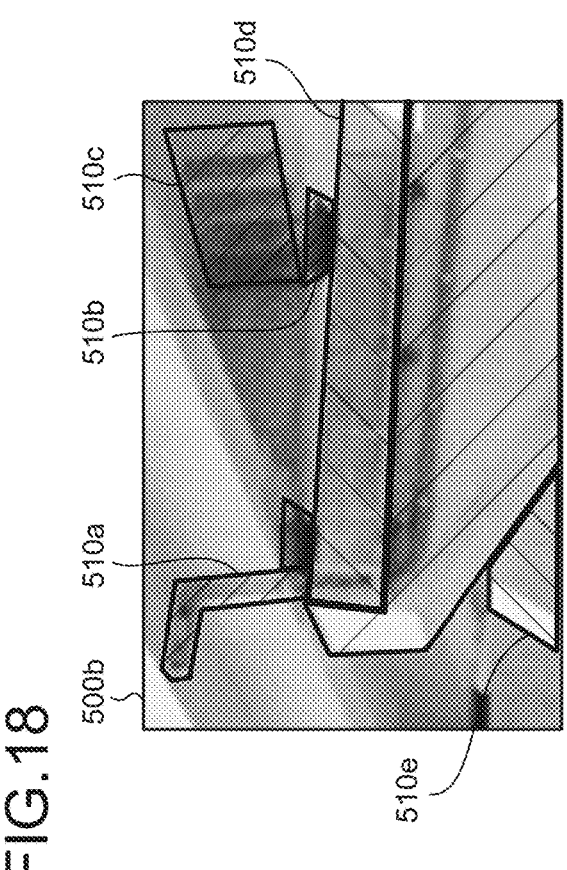
FIG. 18 is a schematic diagram illustrating an example of an image displayed on a display unit in the abnormality detection processing according to the third embodiment.
Figure 18:
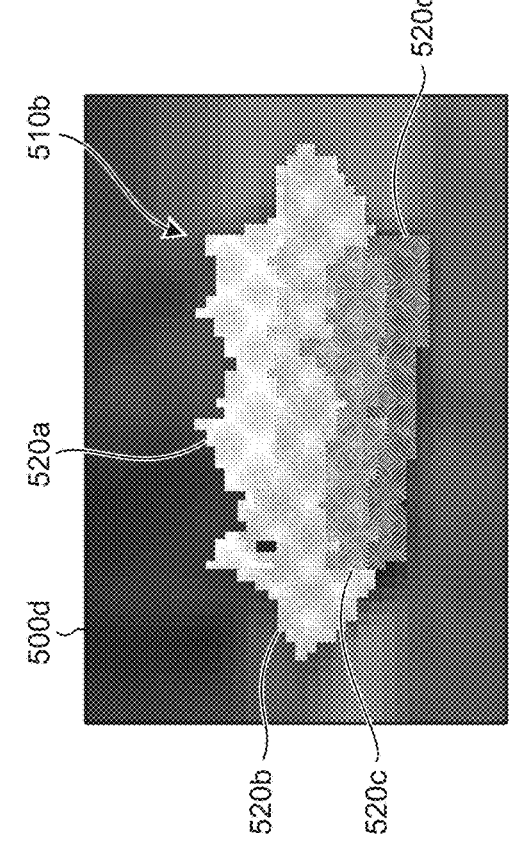
Figure 18:
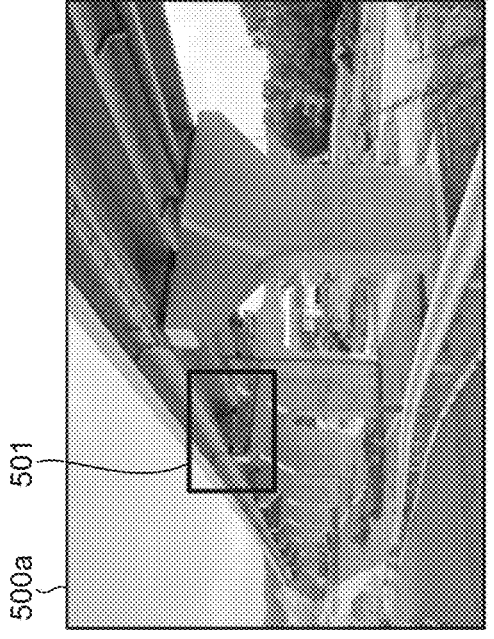
Figure 18:
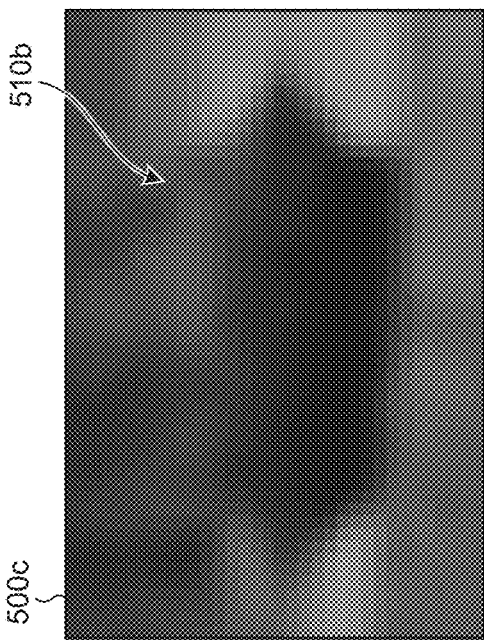

FIG. 17 is a flowchart illustrating an example of abnormality detection processing according to the third embodiment. FIG. 18 is a schematic diagram illustrating an example of an image displayed on the display unit 1013 in the abnormality detection processing according to the third embodiment. Note that, in explanation with reference to FIG. 17, explanation is omitted as appropriate about portions common to the flowchart of FIG. 13 explained above.

In FIG. 17, in step S40, the sensing system 1*c* scans, with the photodetection distance measurement unit 11*a* of the sensor unit 10*b*, the entire region of the scanning range 40 and acquires a point group in the scanning range 40. In step S40, the sensing system 1*c* performs, with the camera 13, imaging in an imaging range corresponding to the scanning range 40 and to acquires a captured image.

In the next step 541, the sensing system 1*c* generates, with the vibration distribution generation unit 125*a*, a 2D image relating to the scanning range 40 based on the captured image captured by the camera 13 in step S40 and generates display control information for displaying the 2D image in the 2D display mode. Since the captured image acquired by the camera 13 has color information by RGB colors, the 2D image displayed in the 2D display mode is a color image. In general, the captured image by the camera 13 has much higher resolution than the point group acquired by the photodetection distance measurement unit 11*a*. The 2D image is also a high-resolution image. The 2D image is displayed by, for example, the display unit 1013 of the information processing apparatus 1000.

In the next step S42, the sensing system 1*c* determines whether an ROI is set for the scanning range 40 acquired in step 540. The ROI may be set according to a user operation, for example, as explained in step S22 of the flowchart of FIG. 13. When determining, with the vibration distribution generation unit 125*a*, that an ROI is not set (step S42, "No"), the sensing system 1*c* returns the processing to step S42. On the other hand, when determining, with the vibration distribution generation unit 125*a*, that an ROI is set (step S42, "Yes"), the sensing system 1*c* shifts the processing to step S43.

An image 500*a* illustrated on the upper left of FIG. 18 indicates, with a rectangle, an example of a 2D image in which an ROI 501 is set. The image 500*a* is a 2D image based on a captured image captured by the camera 13. Therefore, the image 500*a* has resolution corresponding to a pixel array in the camera 13.

In step S43, the sensing system 1*c* scans the ROI 501 with the photodetection distance measurement unit 11*a*. More specifically, the sensing system 1*c* generates, with the local scan control unit 170, a local scan control signal for scanning the ROI 501 and outputs the local scan control signal to the photodetection distance measurement unit 11*a*. The photodetection distance measurement unit 11*a* scans the ROI 501 according to the local scan control signal supplied from the local scan control unit 170. As explained in step S23 in FIG. 13, in step S43, the photodetection distance measurement unit 11*a* can scan the ROI 501 at higher density than the scanning of the entire region in step S40 and can acquire a point group at higher resolution.

In the next step S44, the sensing system 1*c* causes, with the vibration distribution generation unit 125*a*, based on the point group acquired by the scanning of the ROI in step S43, the display unit 1013 to display an image of the ROI 501 in the 3D display mode. The image displayed here is an image based on a combined point group obtained by the point group combining unit 160 combining the captured image and the point group. Therefore, the image of the ROI 501 displayed in step S44 is a higher-resolution image compared with, for example, the image of the ROI 401 displayed in step S24 in FIG. 13. In the 3D display mode, the vibration distribution generation unit 125*a* causes, based on 3D recognition information, which is an object recognition result by the 3D object recognition unit 122*a*, the display unit 1013 to display candidates of a target for which a vibration distribution is detected included in the ROI 501.

An image 500*b* illustrated on the upper right of FIG. 18 indicates an example in which the ROI 501 in the image 500*a* on the upper left of the figure is enlarged and displayed and target candidates are displayed. In the example of the image 500*b*, regions 510*a* to 510*e* extracted as the target candidates based on the 3D recognition information are respectively indicated by hatching. These regions 510*a* to 510*e* are recognized, for example, by the 3D object recognition unit 122*a* as being different parts in the ROI 501.

In FIG. 17, in the next step S45, the sensing system 1*c* determines, with the vibration distribution generation unit 125*a*, whether a target for vibration distribution detection has been selected from the regions 510*a* to 510*e* presented as the target candidates in step S44.

For example, the sensing system 1*c* selects a target to be subjected to vibration distribution detection from the regions 510*a* to 510*e* according to user operation on the image 500*b* displayed by the display unit 1013 in step S44. When determining, with the vibration distribution generation unit 125*a*, that no target has been set (step S45, "No"), the sensing system 1*c* returns the processing to step S45. On the other hand, when determining, with the vibration distribution generation unit 125*a*, that a target has been selected (step S45, "Yes"), the sensing system 1*c* shifts the processing to step S46.

An image 500*c* illustrated on the lower left of FIG. 18 indicates an example of a case in which the region 510*b* is selected as a target from the target candidates in step S45. Note that it is also possible to select a plurality of regions as targets.

In the next step S46, the sensing system 1*c* scans, with the photodetection distance measurement unit 11*a*, the target region (the region 510*b* in this example) selected in step S45.

More specifically, the sensing system 1*c* generates, with the local scan control unit 170, a local scan control signal for scanning the target region and outputs the local scan control signal to the photodetection distance measurement unit 11*a*. The photodetection distance measurement unit 11*a* scans the target region according to the local scan control signal supplied from the local scan control unit 170. The sensing system 1*c* generates, with the angle of view control unit 171, an angle of view control signal for setting the target region as an imaging range and outputs the angle of view control signal to the camera 13. The angle of view control signal includes, for example, zoom control information for changing an angle of view at which imaging is performed to an angle of view corresponding to the target region and imaging direction control information for imaging a direction of the target region.

As in the explanation in step S26 in FIG. 13, in step S46, the photodetection distance measurement unit 11*a* can scan the target region at higher density than the scanning of the entire region in step S40 and the scanning of the ROI 501 in step S43. Therefore, it is possible to acquire a point group having higher resolution than a point group acquired by scanning for the entire region or scanning for the ROI 501.

The camera 13 can image the target region at the resolution of the camera 13, for example, by performing optical zoom operation. If the resolution of the camera 13 is sufficiently high, even when zoom operation is electronically performed (for example, enlargement by image processing), it is possible to image the target region at higher resolution compared with the point group.

In the next step S47, the sensing system 1*c* detects, with the vibration distribution generation unit 125*a*, a vibration distribution for the target region (the region 510*b* in this example) scanned and imaged in step S46 and outputs the vibration distribution in the target region. The vibration distribution generation processing by the vibration distribution generation unit 125*a* is explained below.

An image 500*d* illustrated on the lower right of FIG. 18 is an image schematically indicating a vibration distribution in the target region (the region 510*b* in this example) generated by the vibration distribution generation unit 125*a*. In the image 500*d*, the region 510*b*, which is the target region, is divided into regions 520*a* to 520*d* according to a degree of vibration. The vibration distribution in the region 510*b* is indicated.

In the next step S48, the sensing system 1*c* determines, with the abnormality detection unit 20*a*, based on the vibration distribution output from the vibration distribution generation unit 125*a*, whether a region where a degree of vibration exceeds a threshold is present in the target region. For example, the vibration distribution generation unit 125*a* performs threshold determination on the degree of vibration explained above.

When it is determined by the abnormality detection unit 20*a* that a region where a degree of vibration exceeds the threshold is present in the target region (step S48, "Yes"), the sensing system 1c shifts the processing to step S49 and determines that an abnormality has been detected in the target region. On the other hand, when it is determined by the abnormality detection unit 20a determines that a region where a degree of vibration exceeds the threshold is absent in the target region (step S48, "No"), the sensing system 1c shifts the processing to step S50 and determines that there is no abnormality in the target region.

After the processing in step S49 or step S50, a series of processing by the flowchart of FIG. 17 is ended.

Figure 19:
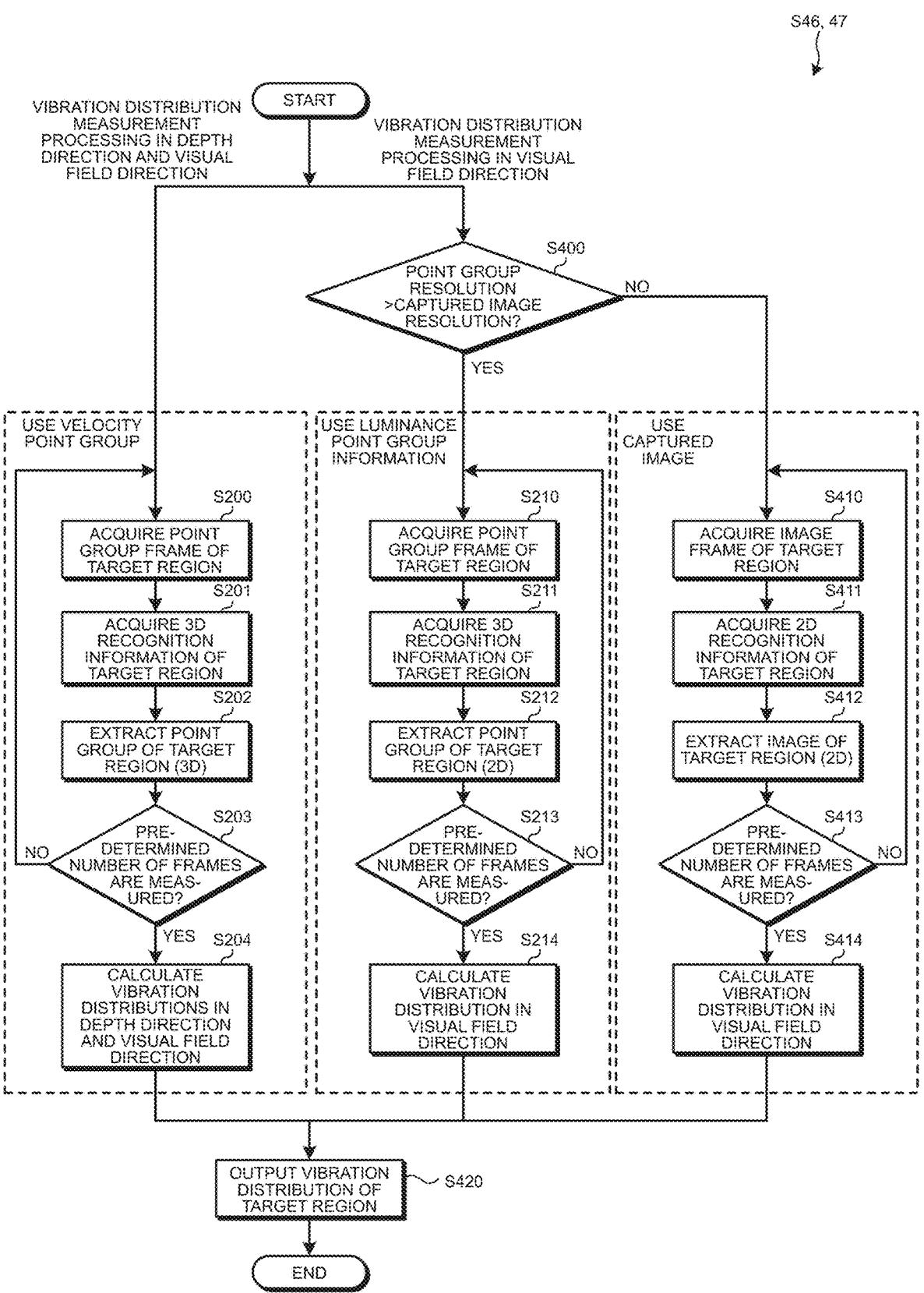
FIG. 19 is a flowchart illustrating an example of vibration distribution generation processing according to the third embodiment.

FIG. 19 is a flowchart of an example illustrating the vibration distribution generation processing according to the third embodiment. The flowchart of FIG. 19 is an example in which the processing in step S46 and step S47 in FIG. 17 explained above is illustrated more in detail. The flowchart is executed in, for example, the vibration distribution generation unit 125a. Note that, in the explanation with reference to FIG. 19, explanation is omitted as appropriate about portions common to the flowchart of FIG. 15 explained above.

In FIG. 19, processing in step S200 to step S204 on the left side is processing for measuring vibration distributions in a depth direction and a visual field direction using a velocity point group. Processing in step S210 to step S214 in the center and processing in step S410 to step S414 on the left side are respectively processing for measuring a vibration distribution in the visual field direction using luminance information. Here, the processing in step S210 to step S214 is processing based on a luminance point group acquired by the photodetection distance measurement unit 11a and the processing in step S410 to step S414 is processing based on a captured image acquired by the camera 13.

Note that the processing in step S200 to step S204 and the processing in step S210 to step S214 are similar to the processing in step S200 to step S214 and the processing in step S210 to step S214 explained with reference to FIG. 15. Therefore, explanation of the processing is omitted here. Here, the processing in step S200 and step S210 and the processing in step S410 in FIG. 19 respectively correspond to the processing in step S46 in the flowchart of FIG. 17.

When the processing by the flowchart of FIG. 19 is started, the vibration distribution generation unit 125a executes the processing in step S200 to step S204. At the same time, in step S400, the vibration distribution generation unit 125a divides the processing into the processing in step S210 to step S214 and the processing in step S410 to step S414 according to the resolution of the point group acquired by the photodetection distance measurement unit 11a and the resolution of the captured image acquired by the camera 13.

That is, although, in general, the resolution of the camera 13 is higher than the resolution of the photodetection distance measurement unit 11a, it could occur that the resolution of the photodetection distance measurement unit 11a is higher than the resolution of the camera 13 depending on the target region set in step S45 of the flowchart of FIG. 17. For example, when the target region is narrowed down to a very small range, it is likely that the resolution of the point group acquired by the photodetection distance measurement unit 11a is higher than the resolution of the captured image acquired by the camera 13. The relation between the resolution of the photodetection distance measurement unit 11a and the resolution of the camera 13 may change depending on the specifications of the photodetection distance measurement unit 11a and the camera 13.

When the resolution of the point group is higher than the resolution of the captured image (step S400, "Yes"), the vibration distribution generation unit 125a shifts the processing to step S210. On the other hand, when the resolution of the point group is equal to or lower than the resolution of the captured image (step S400, "No"), the vibration distribution generation unit 125a shifts the processing to step S410.

In step S410, the vibration distribution generation unit 125a acquires an image frame by the captured image of the target region output from the camera 13. In the next step S411, the vibration distribution generation unit 125a acquires 2D recognition information obtained by the recognition processing by the 2D object recognition unit 152 for the image frame of the target region. In the next step S412, the vibration distribution generation unit 125a extracts an image of the target region from the captured image acquired in step S410. The vibration distribution generation unit 125a may cause the storage unit 126a to store the extracted image of the target region.

In the next step S413, the vibration distribution generation unit 125a determines whether measurement of a predetermined number of image frames necessary for vibration detection in the visual field direction has been executed. When determining that the measurement of the predetermined number of image frames has not been executed (step S413, "No"), the vibration distribution generation unit 125a returns the processing to step S400, acquires the next image frame, and executes the measurement for the acquired image frame (step S411, step S412).

On the other hand, when determining that the measurement of the predetermined number of image frames has been executed (step S413, "Yes"), the vibration distribution generation unit 125a shifts the processing to step S414.

In step S414, the vibration distribution generation unit 125a calculates, based on the image frames for a plurality of frames acquired in the processing up to step S413, a vibration distribution in the visual field direction with, for example, the method explained with reference to section (c) of FIG. 1.

The vibration distribution generation unit 125a shifts the process to step S420 after the end of the processes in step S204 and step S214 or after the end of the processing in step S204 and step S414. In step S420, the vibration distribution generation unit 125a integrates the vibration distributions in the depth direction and the visual field direction calculated in step S204 and the vibration distribution in the visual field direction calculated in step S214 or step S414, calculates a vibration distribution of the target region, and outputs vibration distribution information indicating the calculated vibration distribution to the abnormality detection unit 20a.

Note that, as in the flowchart of FIG. 11, in the flowchart of FIG. 19, the processing in step S200 to step S204 and the processing in step S210 to step S214 or the processing in step S410 to step S414 can be executed independently of each other. Not only this, but the processing in step S200 to step S204 and step S210 to step S214 or step S410 to step S414 may be executed in synchronization. Further, step S200 to step S204 and step S210 to step S214 may be processing by the same scan for a common scanning range. In this case, the predetermined number determined in step S203 and step S213 is the same number in step S201 and step S213.

As explained above, in the third embodiment, the 3D object recognition processing is performed on the point group output by the photodetection distance measurement unit 11a that performs the distance measurement by the FMCW-LiDAR and the point group of the target region is extracted based on the recognition result of the 3D object recognition processing. At this time, in the third embodiment, a range narrower than the scanning range 40 for the entire region of the photodetection distance measurement unit 11a is set as a target region and operation for the target region is executed at high density for scanning for the scanning range 40.

In the third embodiment, further, since the captured image having the color information of the RGB colors is acquired using the camera 13, it is possible to color the image based on the point group output from the photodetection distance measurement unit 11a. It is possible to make it easier for the user to select the target region. In general, since the captured image output from the camera 13 has a higher resolution than the point group output from the photodetection distance measurement unit 11a, it is possible to more highly accurately measure the vibration distribution in the target region. It is possible to more highly accurately execute the abnormality detection for the target object based on the measured vibration distribution.

Note that the effects described in this specification are only illustrations and are not limited. Other effects may be present.

Note that the present technique can also take the following configurations.

(1) An information processing apparatus comprising:
a first recognition unit that performs recognition processing based on a point group output by a photodetection distance measurement unit, and outputs three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, the point group including a plurality of points each having velocity information;
a generation unit that generates vibration distribution information indicating a vibration distribution of the target object based on the velocity information and the three-dimensional recognition information; and
a detection unit that detects an abnormality of the target object based on the vibration distribution information.

(2) The information processing apparatus according to the above (1), further comprising
a scan control unit that generates a scan control signal for controlling a scanning range of light by the light transmission unit, wherein
the detection unit
detects an abnormality of the target object based on the vibration distribution information generated by the generation unit based on the point group acquired from the scanning range controlled by the scan control signal.

(3) The information processing apparatus according to the above (1) or (2), wherein
the generation unit
detects, based on a point group corresponding to the target object extracted as three-dimensional information from the point group based on the velocity information of the point group and the three-dimensional recognition information, vibration of the target object in an optical axis direction of light transmitted by the light transmission unit and generates first vibration distribution information included in the vibration distribution information, the first vibration distribution information indicating a distribution of vibration in the optical axis direction on a surface crossing the optical axis direction.

(4) The information processing apparatus according to the above (3), wherein
the point group further includes luminance information indicating luminance of each of the plurality of points included in the point group,
the generation unit
detects, based on the point group corresponding to the target object extracted as two-dimensional information from the point group based on the luminance information and the three-dimensional recognition information, vibration in a visual field direction of the photodetection distance measurement unit and generates second vibration distribution information included in the vibration distribution information, the second vibration distribution information indicating a distribution of vibration in the visual field direction, and
the detection unit
detects an abnormality of the target object based on the first vibration distribution information and the second vibration distribution information generated by the generation unit.

(5) The information processing apparatus according to the above (4), wherein
the generation unit
detects, based on the point group corresponding to the target object extracted as three-dimensional information from the point group based on the velocity information of the point group and the three-dimensional recognition information, vibration in the visual field direction of the photodetection distance measurement unit and further generates third vibration distribution information included in the vibration distribution information, the third vibration distribution information indicating a distribution of vibration in the visual field direction, and
the detection unit
detects an abnormality of the target object based on the first vibration distribution information, the second vibration distribution information, and the third vibration distribution information generated by the generation unit.

(6) The information processing apparatus according to any one of the above (1) to (5), wherein
the first recognition unit
performs the recognition processing based on a point group included in a target region set for the point group among the point groups output by the photodetection distance measurement unit.

(7) The information processing apparatus according to the above (6), wherein
the target region is
set based on a region of interest set for the point group among the point groups output by the photodetection distance measurement unit.

(8) The information processing apparatus according to any one of the above (1) to (7), further comprising
a second recognition unit that performs recognition processing based on a captured image output by an image sensor that outputs the captured image including color information based on received light and outputs two-dimensional recognition information of the target object, wherein the generation unit generates the vibration distribution information of the target object based on the velocity information, the captured image, the three-dimensional recognition information, and the two-dimensional recognition information.

(9) The information processing apparatus according to the above (8), wherein the generation unit detects, based on a point group corresponding to the target object extracted as three-dimensional information from the point group based on the velocity information of the point group and the three-dimensional recognition information, vibration of the target object in an optical axis direction of light transmitted by the light transmission unit and generates first vibration distribution information included in the vibration distribution information, the first vibration distribution information indicating a distribution of vibration in the optical axis direction on a surface crossing the optical axis direction, detects, based on the point group corresponding to the target object extracted as two-dimensional information from the point group based on luminance information indicating luminance of each of the plurality of points included in the point group and the three-dimensional recognition information, vibration in a visual field direction of the photodetection distance measurement unit and generates second vibration distribution information included in the vibration distribution information, the second vibration distribution information indicating a distribution of vibration in the visual field direction, detects, based on the point group corresponding to the target object extracted as three-dimensional information from the point group based on the velocity information of the point group and the three-dimensional recognition information, vibration in the visual field direction of the photodetection distance measurement unit and generates third vibration distribution information included in the vibration distribution information, the third vibration distribution information indicating a distribution of vibration in the visual field direction, and generates, based on the two-dimensional recognition information output by the second recognition unit, fourth vibration distribution information indicating a distribution of vibration in the visual field direction, and the detection unit detects an abnormality of the target object using the first vibration distribution information, the second vibration distribution information, the third vibration distribution information, and the fourth vibration distribution information.

(10) The information processing apparatus according to the above (9), wherein the generation unit selects, based on the resolution of the point group output from the photodetection distance measurement unit and the resolution of an image output from the image sensor, which of the second vibration distribution information and the fourth vibration distribution information is used as the vibration distribution information in the visual field direction.

(11) The information processing apparatus according to the above (10), wherein the generation unit selects the second vibration distribution information when the resolution of the point group output from the photodetection distance measurement unit is higher than the resolution of the image output from the image sensor and selects the fourth vibration distribution information when the resolution of the image output from the image sensor is higher than the resolution of the point group output from the photodetection distance measurement unit.

(12) The information processing apparatus according to any one of the above (8) to (11), wherein the first recognition unit and the second recognition unit each perform the recognition processing based on a target region set for the captured image output by the image sensor.

(13) The information processing apparatus according to the above (12), wherein the target region is set based on a region of interest set for the captured image.

(14) An information processing method comprising:

a first recognition step of performing recognition processing based on a point group output by a photodetection distance measurement unit, and outputting three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, a point group including a plurality of points each having velocity information;

a generation step of generating vibration distribution information indicating a vibration distribution of the target object based on the velocity information and the three-dimensional recognition information; and a detection step of detecting an abnormality of the target object based on the vibration distribution information.

(15) A sensing system comprising:

a photodetection distance measurement unit including a light transmission unit that transmits light modulated by a frequency continuous modulation wave and a light reception unit that receives light and outputs a reception signal, the photodetection distance measurement unit outputting, based on the reception signal, a point group including a plurality of points each having velocity information;

a first recognition unit that performs recognition processing based on the point group output by the photodetection distance measurement unit and outputs three-dimensional recognition information of a target object;

a generation unit that generates vibration distribution information indicating a vibration distribution of the target object based on the velocity information and the three-dimensional recognition information; and a detection unit that detects an abnormality of the target object based on the vibration distribution information.

REFERENCE SIGNS LIST 1, 1a, 1b, 1c SENSING SYSTEM
10, 10a SENSOR UNIT
11, 11a PHOTODETECTION DISTANCE MEASUREMENT UNIT
12, 12a, 12b, 12c SIGNAL PROCESSING UNIT
13 CAMERA
20, 20a ABNORMALITY DETECTION UNIT
40 SCANNING RANGE
41 SCANNING LINE
50 TARGET OBJECT
100 SCANNING UNIT
101 LIGHT TRANSMISSION UNIT
103 LIGHT RECEPTION UNIT
111 SCAN CONTROL UNIT
112 ANGLE DETECTION UNIT
116 TRANSMISSION LIGHT CONTROL UNIT
117 RECEPTION SIGNAL PROCESSING UNIT
130 POINT GROUP GENERATION UNIT
121, 121a 3D OBJECT DETECTION UNIT
122, 122a 3D OBJECT RECOGNITION UNIT
123, 123a INTERFACE UNIT
125, 125a VIBRATION DISTRIBUTION GENERATION UNIT
126, 126a STORAGE UNIT
151 2D OBJECT DETECTION UNIT
152 2D OBJECT RECOGNITION UNIT
170 LOCAL SCAN CONTROL UNIT
171 ANGLE OF VIEW CONTROL UNIT
300a, 300b, 300c, 300d, 400a, 400b, 400c, 400d, 500a, 500b, 500c, 500d IMAGE
301, 401, 501 ROI
310a, 310b, 310c, 310d, 310e, 320a, 320b, 320c, 320d, 410a, 410b, 410c, 410d, 410e, 420a, 420b, 420c, 420d, 510a, 510b, 510c, 510d, 510e, 520a, 520b, 520c, 520d REGION

The invention claimed is:

1. An information processing apparatus comprising:
a first recognition unit that performs recognition processing based on a point group output by a photodetection distance measurement unit, and outputs three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, the point group including a plurality of points each having velocity information;
a generation unit that generates vibration distribution information indicating a vibration distribution of the target object based on the velocity information and the three-dimensional recognition information; and
a detection unit that detects an abnormality of the target object based on the vibration distribution information, wherein
the point group includes luminance information indicating luminance of each of the plurality of points included in the point group,
the generation unit
detects, based on a point group corresponding to the target object extracted as three-dimensional information from the point group based on the velocity information of the point group and the three-dimensional recognition information, vibration of the target object in an optical axis direction of light transmitted by the light transmission unit and generates first vibration distribution information included in the vibration distribution information, the first vibration distribution information indicating a distribution of vibration in the optical axis direction on a surface crossing the optical axis direction
detects, based on the point group corresponding to the target object extracted as two-dimensional information from the point group based on luminance information and the three-dimensional recognition information, vibration in a visual field direction of the photodetection distance measurement unit and generates second vibration distribution information included in the vibration distribution information, the second vibration distribution information indicating a distribution of vibration in the visual field direction, and
the detection unit detects an abnormality of the target object based on the first vibration distribution information and the second vibration distribution information generated by the generation unit.

2. The information processing apparatus according to claim 1, further comprising
a scan control unit that generates a scan control signal for controlling a scanning range of light by the light transmission unit, wherein
the detection unit
detects an abnormality of the target object based on the vibration distribution information generated by the generation unit based on the point group acquired from the scanning range controlled by the scan control signal.

3. The information processing apparatus according to claim 1, wherein
the generation unit
detects, based on the point group corresponding to the target object extracted as three-dimensional information from the point group based on the velocity information of the point group and the three-dimensional recognition information, vibration in the visual field direction of the photodetection distance measurement unit and further generates third vibration distribution information included in the vibration distribution information, the third vibration distribution information indicating a distribution of vibration in the visual field direction, and
the detection unit
detects an abnormality of the target object based on the first vibration distribution information, the second vibration distribution information, and the third vibration distribution information generated by the generation unit.

4. The information processing apparatus according to claim 1, wherein
the first recognition unit
performs the recognition processing based on a point group included in a target region set for the point group among the point groups output by the photodetection distance measurement unit.

5. The information processing apparatus according to claim 4, wherein the target region is set based on a region of interest set for the point group among the point groups output by the photodetection distance measurement unit.

6. An information processing apparatus comprising:

a first recognition unit that performs recognition processing based on a point group output by a photodetection distance measurement unit, and outputs three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, the point group including a plurality of points each having velocity information;

a generation unit that generates vibration distribution information indicating a vibration distribution of the target object based on the velocity information and the three-dimensional recognition information; and a detection unit that detects an abnormality of the target object based on the vibration distribution information a second recognition unit that performs recognition processing based on a captured image output by an image sensor that outputs the captured image including color information based on received light and outputs two-dimensional recognition information of the target object, wherein the generation unit generates the vibration distribution information of the target object based on the velocity information, the captured image, the three-dimensional recognition information, and the two-dimensional recognition information.

7. The information processing apparatus according to claim 6, wherein the generation unit detects, based on a point group corresponding to the target object extracted as three-dimensional information from the point group based on the velocity information of the point group and the three-dimensional recognition information, vibration of the target object in an optical axis direction of light transmitted by the light transmission unit and generates first vibration distribution information included in the vibration distribution information, the first vibration distribution information indicating a distribution of vibration in the optical axis direction on a surface crossing the optical axis direction, detects, based on the point group corresponding to the target object extracted as two-dimensional information from the point group based on luminance information indicating luminance of each of the plurality of points included in the point group and the three-dimensional recognition information, vibration in a visual field direction of the photodetection distance measurement unit and generates second vibration distribution information included in the vibration distribution information, the second vibration distribution information indicating a distribution of vibration in the visual field direction, detects, based on the point group corresponding to the target object extracted as three-dimensional information from the point group based on the velocity information of the point group and the three-dimensional recognition information, vibration in the visual field direction of the photodetection distance measurement unit and generates third vibration distribution information included in the vibration distribution information, the third vibration distribution information indicating a distribution of vibration in the visual field direction, and generates, based on the two-dimensional recognition information output by the second recognition unit, fourth vibration distribution information indicating a distribution of vibration in the visual field direction, and the detection unit detects an abnormality of the target object using the first vibration distribution information, the second vibration distribution information, the third vibration distribution information, and the fourth vibration distribution information.

8. The information processing apparatus according to claim 7, wherein the generation unit selects, based on the resolution of the point group output from the photodetection distance measurement unit and the resolution of an image output from the image sensor, which of the second vibration distribution information and the fourth vibration distribution information is used as the vibration distribution information in the visual field direction.

9. The information processing apparatus according to claim 8, wherein the generation unit selects the second vibration distribution information when the resolution of the point group output from the photodetection distance measurement unit is higher than the resolution of the image output from the image sensor and selects the fourth vibration distribution information when the resolution of the image output from the image sensor is higher than the resolution of the point group output from the photodetection distance measurement unit.

10. The information processing apparatus according to claim 6, wherein the first recognition unit and the second recognition unit each perform the recognition processing based on a target region set for the captured image output by the image sensor.

11. The information processing apparatus according to claim 10, wherein the target region is set based on a region of interest set for the captured image.

12. An information processing method comprising:

performing recognition processing based on a point group output by a photodetection distance measurement unit, and outputting three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, a point group including a plurality of points each having velocity information, wherein the point group includes luminance information indicating luminance of each of the plurality of points included in the point group;

generating vibration distribution information indicating a vibration distribution of the target object based on the velocity information and the three-dimensional recognition information;

detecting an abnormality of the target object based on the vibration distribution information;

detecting, based on a point group corresponding to the target object extracted as three-dimensional information from the point group based on the velocity information of the point group and the three-dimensional recognition information, vibration of the target object in an optical axis direction of light transmitted by the light transmission unit and generating first vibration distribution information included in the vibration distribution information, the first vibration distribution information indicating a distribution of vibration in the optical axis direction on a surface crossing the optical axis direction;

detecting, based on the point group corresponding to the target object extracted as two-dimensional information from the point group based on luminance information and the three-dimensional recognition information, vibration in a visual field direction of the photodetection distance measurement unit and generating second vibration distribution information included in the vibration distribution information, the second vibration distribution information indicating a distribution of vibration in the visual field direction; and detecting an abnormality of the target object based on the first vibration distribution information and the second vibration distribution information generated by the generation unit.

13. A sensing system comprising:

a photodetection distance measurement unit including a light transmission unit that transmits light modulated by a frequency continuous modulation wave and a light reception unit that receives light and outputs a reception signal, the photodetection distance measurement unit outputting, based on the reception signal, a point group including a plurality of points each having velocity information;

a first recognition unit that performs recognition processing based on the point group output by the photodetection distance measurement unit and outputs three-dimensional recognition information of a target object;

a generation unit that generates vibration distribution information indicating a vibration distribution of the target object based on the velocity information and the three-dimensional recognition information; and a detection unit that detects an abnormality of the target object based on the vibration distribution information, wherein the point group includes luminance information indicating luminance of each of the plurality of points included in the point group, the generation unit detects, based on a point group corresponding to the target object extracted as three-dimensional information from the point group based on the velocity information of the point group and the three-dimensional recognition information, vibration of the target object in an optical axis direction of light transmitted by the light transmission unit and generates first vibration distribution information included in the vibration distribution information, the first vibration distribution information indicating a distribution of vibration in the optical axis direction on a surface crossing the optical axis direction detects, based on the point group corresponding to the target object extracted as two-dimensional information from the point group based on luminance information and the three-dimensional recognition information, vibration in a visual field direction of the photodetection distance measurement unit and generates second vibration distribution information included in the vibration distribution information, the second vibration distribution information indicating a distribution of vibration in the visual field direction, and the detection unit detects an abnormality of the target object based on the first vibration distribution information and the second vibration distribution information generated by the generation unit.

14. A non-transitory computer readable medium storing a program, the program being executable by a processor to perform operations comprising:

performing recognition processing based on a point group output by a photodetection distance measurement unit, and outputting three-dimensional recognition information of a target object, the photodetection distance measurement unit including a light transmission unit that transmits light modulated by a frequency continuous modulation wave and a light reception unit that receives light and outputs a reception signal, and outputting, based on the reception signal, a point group including a plurality of points each having velocity information, wherein the point group includes luminance information indicating luminance of each of the plurality of points included in the point group;

generating vibration distribution information indicating a vibration distribution of the target object based on the velocity information and the three-dimensional recognition information;

detecting an abnormality of the target object based on the vibration distribution information;

detecting, based on a point group corresponding to the target object extracted as three-dimensional information from the point group based on the velocity information of the point group and the three-dimensional recognition information, vibration of the target object in an optical axis direction of light transmitted by the light transmission unit and generating first vibration distribution information included in the vibration distribution information, the first vibration distribution information indicating a distribution of vibration in the optical axis direction on a surface crossing the optical axis direction;

detecting, based on the point group corresponding to the target object extracted as two-dimensional information from the point group based on luminance information and the three-dimensional recognition information, vibration in a visual field direction of the photodetection distance measurement unit and generating second vibration distribution information included in the vibration distribution information, the second vibration distribution information indicating a distribution of vibration in the visual field direction; and detecting an abnormality of the target object based on the first vibration distribution information and the second vibration distribution information generated by the generation unit.

15. The non-transitory computer readable medium according to claim 14, wherein the operations further comprise:

generating a scan control signal for controlling a scanning range of light by the light transmission unit; and detecting an abnormality of the target object based on the vibration distribution information based on the point group acquired from the scanning range controlled by the scan control signal.

16. The non-transitory computer readable medium according to claim 14, wherein the operations further comprise:

detecting, based on the point group corresponding to the target object extracted as three-dimensional information from the point group based on the velocity information of the point group and the three-dimensional recognition information, vibration in the visual field direction of the photodetection distance measurement unit;

generating third vibration distribution information included in the vibration distribution information, the third vibration distribution information indicating a distribution of vibration in the visual field direction; and detecting an abnormality of the target object based on the first vibration distribution information, the second vibration distribution information, and the third vibration distribution information.

17. The non-transitory computer readable medium according to claim 14, wherein the operations further comprise:

performing the recognition processing based on a point group included in a target region set for the point group among the point groups.

18. The non-transitory computer readable medium according to claim 17, wherein the target region is set based on a region of interest set for the point group among the point groups.

\* \* \* \* \*